United States Patent
Kerigan et al.

(10) Patent No.: US 9,612,786 B2
(45) Date of Patent: Apr. 4, 2017

(54) DOCUMENT OUTPUT PROCESSING

(71) Applicant: THE TORONTO DOMINION BANK, Toronto (CA)

(72) Inventors: Thomas M. Kerigan, Toronto (CA); Robert Trojan, Toronto (CA); Jeffrey A. Martin, Whitey (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

(21) Appl. No.: 15/217,736

(22) Filed: Jul. 22, 2016

(65) Prior Publication Data

US 2017/0010842 A1   Jan. 12, 2017

Related U.S. Application Data

(63) Continuation of application No. 11/610,087, filed on Dec. 13, 2006, now abandoned.

(51) Int. Cl.
*G06F 3/12*   (2006.01)
*H04N 1/00*   (2006.01)

(52) U.S. Cl.
CPC .......... *G06F 3/1243* (2013.01); *G06F 3/1204* (2013.01); *G06F 3/1288* (2013.01); *H04N 1/00212* (2013.01); *H04N 1/00233* (2013.01); *H04N 1/00344* (2013.01); *H04N 2201/0094* (2013.01)

(58) Field of Classification Search
CPC .................................................... G06F 3/1243
See application file for complete search history.

(56) References Cited

U.S. PATENT DOCUMENTS

| 5,737,619 A | 4/1998 | Judson |
| 5,890,173 A | 3/1999 | Yoda |
| 6,041,309 A | 3/2000 | Laor |
| 6,067,560 A | 5/2000 | Potts |

(Continued)

FOREIGN PATENT DOCUMENTS

| EP | 0872792 A2 | 10/1998 |
| EP | 0920180 A2 | 6/1999 |

(Continued)

OTHER PUBLICATIONS

Canadian Office Action issued in the corresponding Canadian Patent Application No. 2571092 mailed on Feb. 12, 2013.

(Continued)

*Primary Examiner* — Benjamin O Dulaney
(74) *Attorney, Agent, or Firm* — Roberts Mlotkowski Safran Cole & Calderon P.C.

(57) ABSTRACT

The invention relates to printing and other output of documents using data processors, and particularly to methods, apparatus, and computer programming useful for controlling output processes. In various aspects the invention provides systems, methods, and computer programming useful for minimizing the number of command inputs required from a user to complete printing or other output of multiple documents. In other aspects, the invention provides systems, methods, and computer programming useful for printing documents using content data received from users or other sources, together with previously-provided form data, according to predetermined formats.

20 Claims, 24 Drawing Sheets

(56) References Cited

U.S. PATENT DOCUMENTS

| | | |
|---|---|---|
| 6,222,634 B1 | 4/2001 | Dubbels et al. |
| 6,327,045 B1 | 12/2001 | Teng et al. |
| 6,445,468 B1 | 9/2002 | Tsai |
| 6,473,203 B1 | 10/2002 | Hisatomi et al. |
| 6,609,843 B2 | 8/2003 | Mahoney et al. |
| 6,631,010 B1 | 10/2003 | Foster et al. |
| 6,662,340 B2* | 12/2003 | Rawat ............... G06F 17/243 705/34 |
| 6,750,978 B1 | 6/2004 | Marggraff et al. |
| 6,842,262 B1 | 1/2005 | Gillihan et al. |
| 6,938,202 B1 | 8/2005 | Matsubayashi et al. |
| 7,003,489 B1 | 2/2006 | Dixon et al. |
| 7,038,796 B1 | 5/2006 | Gupta et al. |
| 7,073,119 B2 | 7/2006 | Matsubayashi et al. |
| 7,100,114 B1 | 8/2006 | Burleson |
| 7,203,441 B2 | 4/2007 | Doi et al. |
| 7,215,434 B1 | 5/2007 | Janse et al. |
| 7,500,178 B1* | 3/2009 | O'Donnell ............ G06F 17/243 707/999.01 |
| 7,539,635 B1 | 5/2009 | Peak et al. |
| 7,636,742 B1 | 12/2009 | Olavarrieta et al. |
| 2002/0072998 A1 | 6/2002 | Haines et al. |
| 2002/0082984 A1 | 6/2002 | Zappier |
| 2002/0085224 A1 | 7/2002 | Price et al. |
| 2002/0093676 A1 | 7/2002 | Parry |
| 2003/0023491 A1 | 1/2003 | Brizendine et al. |
| 2003/0074396 A1 | 4/2003 | Simpson |
| 2003/0196171 A1 | 10/2003 | Distefano |
| 2004/0075682 A1 | 4/2004 | Burleson |
| 2005/0021608 A1 | 1/2005 | Wolff |
| 2006/0100912 A1 | 5/2006 | Kumar et al. |
| 2006/0156229 A1 | 7/2006 | Morgan |
| 2006/0168509 A1 | 7/2006 | Boss et al. |
| 2006/0170948 A1 | 8/2006 | Kobashi |
| 2006/0279772 A1 | 12/2006 | Ludwig et al. |
| 2006/0282504 A1* | 12/2006 | Yoshioka ............... G06Q 10/10 709/207 |
| 2007/0024906 A9 | 2/2007 | Whittingham et al. |
| 2007/0041035 A1 | 2/2007 | Sembower et al. |
| 2007/0067234 A1 | 3/2007 | Beech |
| 2007/0171464 A1 | 7/2007 | Nakajima |
| 2008/0005651 A1 | 1/2008 | Grefenstette et al. |
| 2009/0055220 A1 | 2/2009 | Rapaport et al. |
| 2010/0211515 A1 | 8/2010 | Woodings et al. |

FOREIGN PATENT DOCUMENTS

| | | |
|---|---|---|
| EP | 0957438 A2 | 11/1999 |
| JP | 2001014120 A | 1/2001 |
| WO | 9848359 A1 | 10/1998 |
| WO | 9927468 A1 | 6/1999 |

OTHER PUBLICATIONS

Examiner's Search Strategy and Results, from U.S. Appl. No. 09/753,598, STIC Search Report, Monday Aug. 16, 2004 (59 pages).

Reese et al., "eReference drag-and-drop printing", Sep. 2002, Research Disclosure Journal, Kenneth Mason Publications Ltd. (3 Pages).

Author Anonymous, "One-step multiple-file print feature for software application", Apr. 2002, Research Disclosure Journal, Kenneth Mason Publications Ltd. (3 pages).

* cited by examiner

```xml
<?xml version="1.0" encoding="UTF-8" ?>
<!-- edited with XMLSPY v2004 rel. 2 U (http://www.xmlspy.com) by Joe Tell (TD
Bank Financial Group) -->
<!-- W3C Schema generated by XMLSPY v5 rel. 4 U (http://www.xmlspy.com) -->
<xs:schema xmlns:xs="http://www.w3.org/2001/XMLSchema"
  elementFormDefault="qualified">
  <xs:simpleType name="CL-CUSTOMER-NAME_Type">     ⎫
    <xs:restriction base="xs:string">              ⎬ 601
      <xs:maxLength value="122" />                 ⎪
    </xs:restriction>                              ⎪
  </xs:simpleType>                                 ⎭
  <xs:element name="f513602">
    <xs:complexType>                               ⎫
      <xs:sequence>                                ⎪
        <xs:element name="CL-CUSTOMER-NAME" type="CL-CUSTOMER-   ⎬ 603
          NAME_Type" minOccurs="0" />              ⎪
      </xs:sequence>                               ⎭
    </xs:complexType>
  </xs:element>
</xs:schema>
```

```
602 ┤ <?xml version="1.0" encoding="ISO-8859-1" ?>
    │ <!-- created with XML Spy v5.4 U (http://www.xmlspy.com)    (TD
    │     -->
604 ┤ <xsl:stylesheet version="1.0" xmlns:xsl="http://www.w3.org/1999/XSL/Transform"
    │   xmlns:fo="http://www.w3.org/1999/XSL/Format"                                    600
    │   xmlns:xs="http://www.w3.org/2001/XMLSchema">
    │ <xsl:param name="BASE_URL" />
      <xsl:variable name="fo:layout-master-set">
      - <fo:layout-master-set>
606
608 ┤  <fo:simple-page-master master-name="page-one" page-height="11in" page-
    │     width="8.5in" margin-left="0.333in" margin-right=".333in" margin-
    │     top=".333in">
    │   <fo:region-body font-family="Times Roman" font-size="9pt" />
        <fo:region-after extent=".333in" />
        </fo:simple-page-master>
      </fo:layout-master-set>
      /xsl:variable>
    <xsl:template match="/">
    - <fo:root>
        <xsl:copy-of select="$fo:layout-master-set" />
      - <fo:page-sequence master-reference="page-one">
        - <fo:static-content flow-name="xsl-region-after">
          - <fo:table width="100%">
             <fo:table-column column-width="proportional-column-width
               (100)" />
           - <fo:table-body>
610       - <fo:table-row>
             - <fo:table-cell font-family="Futura,Times Roman,serif">
                <fo:block font-size="7pt" text-align="right">513602
                (0306)</fo:block>
             </fo:table-cell>
           </fo:table-row>
          </fo:table-body>
         </fo:table>                                                612
        </fo:static-content>
      - <fo:flow flow-name="xsl-region-body" font-family="Times Roman" font-
         size="9pt">
       - <fo:block id="last">
         <xsl:for-each select="f513602">
         - <fo:table width="100%">
            <fo:table-column />                                     612
            <fo:table-column />
          - <fo:table-body>
           - <fo:table-row height="15mm">
            - <fo:table-cell>
620          - <fo:external-graphic width="58mm"
                height="10mm">
               - <xsl:attribute name="src">
                  <xsl:text disable-output-
                    escaping="yes">url('</xsl:text>
                  <xsl:value-of select="$BASE_URL" /> 618
                  <xsl:text disable-output-
                    escaping="yes">tdct.gif')</xsl:text>    FIG. 6B1
```

```
              </xsl:attribute>
            </fo:external-graphic>
          </fo:table-cell>
        - <fo:table-cell>
            <fo:block font-family="Helvetica" font-
              style="normal" font-size="12pt" font-
              weight="bold" text-align="end" padding-
              before="4pt">Borrowing
              Authority</fo:block>
          </fo:table-cell>
        </fo:table-row>
      </fo:table-body>
    </fo:table>
    <fo:block />
    <fo:block> </fo:block>
  - <fo:block>
    - <fo:inline>
        <fo:leader leader-length="40mm" leader-
          pattern="space" />
      </fo:inline>
    - <xsl:if test="string-length(CL-CUSTOMER-NAME) >
        99">
      - <fo:inline font-size="8.5pt">
          <xsl:value-of select="CL-CUSTOMER-NAME" />
        </fo:inline>
      </xsl:if>
    - <xsl:if test="string-length(CL-CUSTOMER-NAME) <
        100">
      - <fo:inline>
          <xsl:value-of select="CL-CUSTOMER-NAME" />
        </fo:inline>
      </xsl:if>
    </fo:block>
  - <fo:block font-size=".5pt">
    - <fo:inline>
        <fo:leader leader-length="37.5mm" leader-
          pattern="space" />
        <fo:leader leader-length="161mm" leader-
          pattern="rule" rule-thickness=".5pt" />
      </fo:inline>
    - <!--

<fo:inline>

-->
    </fo:block>
  - <fo:block>
    - <fo:inline>
        <fo:leader leader-length="105mm" leader-
          pattern="space" />
      </fo:inline>
```

```
<fo:block>borrow money upon the credit of                           626
    the Customer by loans, advances,
    overdraft or otherwise;</fo:block>
  </fo:table-cell>
</fo:table-row>
- <fo:table-row>
  - <fo:table-cell>
    <fo:block> </fo:block>
    </fo:table-cell>
  </fo:table-row>
- <fo:table-row>
  - <fo:table-cell>
    <fo:block text-align="right">(b)</fo:block>
    </fo:table-cell>
    <fo:table-cell />
                                                                    628
  - <fo:table-cell>
    <fo:block>issue, sell or pledge securities of
    the Customer including bonds,
    debentures, debenture stock, for sums, on
    terms and at prices considered
    expedient;</fo:block>
    </fo:table-cell>
  </fo:table-row>
- <fo:table-row>
  - <fo:table-cell>
    <fo:block> </fo:block>
    </fo:table-cell>
  </fo:table-row>
- <fo:table-row>
  - <fo:table-cell>
    <fo:block text-align="right">(c)</fo:block>
    </fo:table-cell>
    <fo:table-cell />
  - <fo:table-cell text-align="left">
    <fo:block>assign, transfer, convey,
    hypothecate, mortgage, pledge, charge or
    give security in any manner upon all or
    any of the real or personal, moveable or
    immoveable property, rights, powers, or   630
    other assets, present or future, of the
    Customer to secure any such securities or
    other securities of the Customer or any
    money borrowed or to be borrowed or any
    obligations or liabilities as aforesaid or
    otherwise of the Customer heretofore,
    now or hereafter made or incurred
    directly or indirectly or otherwise;
    and</fo:block>
    </fo:table-cell>
  </fo:table-row>
- <fo:table-row>
  - <fo:table-cell>
    <fo:block> </fo:block>
```

```
        the</fo:block>
          <fo:block font-size="7pt" font-
            style="italic">Authority was
            passed</fo:block>
        </fo:table-cell>
      - <fo:table-cell>
          <fo:block font-size="7pt"> </fo:block>
        - <fo:block>
            ENACTED this
          - <fo:inline>
              <fo:leader leader-length="43mm"
                leader-pattern="rule" rule-
                thickness=".5pt" />
            </fo:inline>
            <fo:inline> day of </fo:inline>
          - <fo:inline>
              <fo:leader leader-length="50mm"
                leader-pattern="rule" rule-
                thickness=".5pt" />
            </fo:inline>
            <fo:inline> , 20 </fo:inline>
          - <fo:inline>
              <fo:leader leader-length="8mm" leader-
                pattern="rule" rule-
                thickness=".5pt" />
            </fo:inline>
            <fo:inline> .</fo:inline>
          </fo:block>
        </fo:table-cell>
      </fo:table-row>
    - <fo:table-row>
      - <fo:table-cell>
          <fo:block> </fo:block>
          <fo:block> </fo:block>
        </fo:table-cell>
      - <fo:table-cell>
          <fo:block> </fo:block>
          <fo:block> </fo:block>
          <fo:block font-weight="bold" text-
            align="center">CERTIFICATE</fo:block>
          <fo:block> </fo:block>
        </fo:table-cell>
      </fo:table-row>
    - <fo:table-row>
      - <fo:table-cell>
          <fo:block font-size="7pt" font-
            style="italic">*Directors if a corporation;            640
            Directors or Trustees if an
            association</fo:block>
        </fo:table-cell>                                                                616
      - <fo:table-cell text-align="left">
          <fo:block>We certify that the foregoing is a
            true copy of the Authority of the Customer
```

FIG. 6B4 duly enacted by the
＊_____
of the Customer; that, if applicable, the Authority was duly passed, confirmed and/or sanctioned by the shareholders or members of the Customer in the manner required by law or otherwise; and that the Authority is now in full force and effect.</fo:block>
    <fo:block> </fo:block>
   </fo:table-cell>
  </fo:table-row>
- <fo:table-row>
   <fo:table-cell />
  - <fo:table-cell>
    <fo:block> </fo:block>
    <fo:block> </fo:block>
   - <fo:block>
    Dated this
    - <fo:inline>
     <fo:leader leader-length="50mm"
      leader-pattern="rule" rule-
      thickness=".5pt" />
    </fo:inline>
    <fo:inline> day of </fo:inline>
    - <fo:inline>
     <fo:leader leader-length="50mm"
      leader-pattern="rule" rule-
      thickness=".5pt" />
    </fo:inline>
    <fo:inline> , 20 </fo:inline>
    - <fo:inline>
     <fo:leader leader-length="8mm" leader-
      pattern="rule" rule-
      thickness=".5pt" />
    </fo:inline>
    <fo:inline> .</fo:inline>
   </fo:block>
   <fo:block> </fo:block>
   <fo:block> </fo:block>
   <fo:block> </fo:block>
  </fo:table-cell>
 </fo:table-row>
- <fo:table-row>
 - <fo:table-cell>
   <fo:block font-size="7pt" font-style="italic">Obtain signatures of Signing Officers as per applicable account documentation</fo:block>
 </fo:table-cell>
- <fo:table-cell>
 - <fo:table width="100%">
  <fo:table-column column-

FIG. 6B5

```xml
            width="proportional-column-width(70)" />
          <fo:table-column column-
            width="proportional-column-width
            (5)" />
          <fo:table-column column-
            width="proportional-column-width
            (70)" />
          - <fo:table-body>
            - <fo:table-row>
              - <fo:table-cell>
                  <fo:block font-size="10pt" font-
                    weight="bold">X</fo:block>
                - <fo:block font-size=".5pt">
                    <fo:leader leader-
                      length="78mm" leader-
                      pattern="rule" rule-
                      thickness=".5pt" />
                  </fo:block>
                  <fo:block padding-
                    before="3pt">Signature</fo:block>
                  <fo:block>Name &
                    Title:</fo:block>
                </fo:table-cell>
                <fo:table-cell />
              - <fo:table-cell>
                  <fo:block font-size="10pt" font-
                    weight="bold">X</fo:block>
                - <fo:block font-size=".5pt">
                    <fo:leader leader-
                      length="78mm" leader-
                      pattern="rule" rule-
                      thickness=".5pt" />
                  </fo:block>
                  <fo:block padding-
                    before="3pt">Signature</fo:block>
                  <fo:block>Name &
                    Title:</fo:block>
                  <fo:block> </fo:block>
                </fo:table-cell>
              </fo:table-row>
            </fo:table-body>
          </fo:table>
        </fo:table-cell>
      </fo:table-row>
    - <fo:table-row>
        <fo:table-cell />
      - <fo:table-cell>
        - <fo:table width="100%">
            <fo:table-column column-
              width="proportional-column-width
              (70)" />
            <fo:table-column column-
              width="proportional-column-width
```

FIG. 6B6

```
            (5)" />
          <fo:table-column column-
             width="proportional-column-width
             (70)" />
        - <fo:table-body>
          - <fo:table-row>
            - <fo:table-cell>
                <fo:block> </fo:block>
                <fo:block> </fo:block>
                <fo:block font-size="10pt" font-
                   weight="bold">X</fo:block>
              - <fo:block font-size=".5pt">
                  <fo:leader leader-
                     length="78mm" leader-
                     pattern="rule" rule-
                     thickness=".5pt" />
                </fo:block>
                <fo:block padding-
                   before="3pt">Signature</fo:block>
                <fo:block>Name &
                   Title:</fo:block>
              </fo:table-cell>
              <fo:table-cell />
            - <fo:table-cell>
                <fo:block> </fo:block>
                <fo:block> </fo:block>
                <fo:block font-size="10pt" font-
                   weight="bold">X</fo:block>
              - <fo:block font-size=".5pt">
                  <fo:leader leader-
                     length="78mm" leader-
                     pattern="rule" rule-
                     thickness=".5pt" />
                </fo:block>
                <fo:block padding-
                   before="3pt">Signature</fo:block>
                <fo:block>Name &
                   Title:</fo:block>
                <fo:block> </fo:block>
              </fo:table-cell>
            </fo:table-row>
          </fo:table-body>
        </fo:table>
      </fo:table-cell>
    </fo:table-row>
  </fo:table-body>
</fo:table>
       </xsl:for-each>
      </fo:block>
     </fo:flow>
    </fo:page-sequence>
   </fo:root>
  </xsl:template>
</ xsl:template >
```

FIG. 6B7

```
<?xml version="1.0" encoding="ISO-8859-1" ?>
<!-- Sample XML file generated by XMLSPY v2004 rel. 2 U
(http://www.xmlspy.com) -->
- <f513602 xmlns:xsi="http://www.w3.org/2001/XMLSchema-instance"
    xsi:noNamespaceSchemaLocation="">
    <CL-CUSTOMER-NAME>    John Doe    </CL-CUSTOMER-NAME>
  </f513602>
```

FIG. 6C

 Canada Trust } 804                           Borrowing Authority

802 — John Doe
*(Name of Customer)*

Incorporated/Existing under _____
*(Name of Act, if applicable)*

BY-LAW/RESOLUTION *(the "Authority")*

NO. _____
*(if applicable)*

1. The Directors or Trustees of the Customer may from time to time:

806 (a) borrow money upon the credit of the Customer by loans, advances, overdraft or otherwise;

808 (b) issue, sell or pledge securities of the Customer including bonds, debentures, debenture stock, for sums, on terms and at prices considered expedient;

810 (c) assign, transfer, convey, hypothecate, mortgage, pledge, charge or give security in any manner upon all or any of the real or personal, moveable or immoveable property, rights, powers, or other assets, present or future, of the Customer to secure any such securities or other securities of the Customer or any money borrowed or to be borrowed or any obligations or liabilities as aforesaid or otherwise of the Customer heretofore, now or hereafter made or incurred directly or indirectly or otherwise; and 816 (d) without in any way limiting the powers herein conferred upon the Directors or Trustees, give security or promises to give security, agreements, documents and instruments in any manner or form under the Bank Act or otherwise to secure any money borrowed or to be borrowed or any obligations or liabilities as aforesaid or otherwise of the Customer heretofore, now or hereafter made or incurred directly or indirectly or otherwise.

818  2. Any or all of the foregoing powers may from time to time be delegated by the Directors or Trustees of the Customer to any one or more of the directors, officers or trustees of the Customer.

820  3. This Authority shall remain in force and the Customer will be bound by this Authority until each of the branches of The Toronto-Dominion Bank where the Customer has an account receives a new document repealing or replacing it.

*Enter the date the Authority was passed*

ENACTED this _____ day of _____, 20 ____.

CERTIFICATE

*Directors if a corporation; Directors or Trustees if an association*

822 We certify that the foregoing is a true copy of the Authority of the Customer duly enacted by the
\* _____ of the Customer; that, if applicable, the Authority was duly passed, confirmed and/or sanctioned by the shareholders or members of the Customer in the manner required by law or otherwise; and that the Authority is now in full force and effect.

Dated this _____ day of _____, 20 ____.

824 *Obtain signatures of Signing Officers as per applicable account documentation*

X _____       X _____
Signature                                    Signature
Name & Title:                           Name & Title:

X _____       X _____
Signature                                    Signature
Name & Title:                           Name & Title:

DOCUMENT OUTPUT PROCESSING

RELATED APPLICATIONS

The present application is a U.S. Continuation Application of pending application Ser. No. 11/610,087 filed on Dec. 13, 2006 entitled "Web-Based Printing of the Combination of Content Data with Form Data". The disclosure of application Ser. No. 11/610,087 is hereby incorporated by reference into the present Application.

SUMMARY OF THE INVENTION

The invention relates to printing and other output of documents using data processors, and particularly to methods, apparatus, and computer programming useful for controlling output processes.

The invention provides systems, methods, and computer programming useful for minimizing the number of command inputs required from a user to complete printing or other output of multiple documents. The invention also provides systems, methods, and computer programming useful for printing documents using content data received from users or other sources, together with previously-provided form data, according to predetermined formats.

For example, the invention provides systems useable for printing or other output of documents, such systems comprising one or more input or other client devices adapted for providing content data to an output server or servers, and one or more form data stores accessible by the output server(s). The form data stores include data useable by the output server(s) for compiling, in combination with the content data, one or more documents according to predetermined formats.

Output servers according to such embodiments of the invention are adapted to access the content data and the form data store, compile the content data and form data, and cause an output device to output at least one document according to the at least one predetermined format, using the compiled data.

Output servers can comprise any hardware or software suitable for use in accomplishing such purposes. For example, an output server can comprise a separate, e.g. remotely-located, physical computer or processor, or a suitably-configured programming structure running on a client device, or any combination(s) thereof.

Output devices can comprise any printers, facsimile transmitters, graphic display devices, or other devices or applications consistent with the purposes described herein. For example, output devices can comprise e-mail servers or applications, bulletin board or chat-type applications, and any desired multi-function devices.

The invention further provides processes for controlling such printing or other output processes. Such processes are performed by a computer or computers such as client devices and/or output servers, and can include receiving from an input or other client device content data useful in preparing one or more documents; accessing in a data store form data useful for compiling, in combination with the received content data, data useful for outputting the at least one document according to at least one predetermined format; compiling the content data and the form data to provide data useful for outputting the at least one document according to the at least one predetermined format; and storing the compiled data in volatile or persistent memory. The volatile or persistent memory can comprise any memory directly or indirectly accessible by the processor(s) controlling the output process, including for example dedicated random access or disk storage, or buffers or other memories associated with printers or other output devices involved with the output process.

In other embodiments the invention provides systems, methods, and computer programming useful for minimizing the number of command inputs required from a user to complete printing or other output of multiple documents. For example, the invention provides methods for controlling output processes which include providing to a processor such as a client computer system data useable by the processor for displaying a user interface, the user interface comprising data identifying a plurality of documents that can be output using content data received from the client device and, with respect to each of the identified documents, at least one corresponding interactive item. Such methods can further include receiving from the client device or other processor a command signal set comprising at least one identification signal, the identification signal identifying at least one of a plurality of the identified documents to be output, and at least one execution signal. Such command signal sets and identification signals can be provided, for example using well-known 'point-and-click' methods using trackballs, mice, or other interface controllers, by enabling a user to select one or more check boxes or radio buttons corresponding to desired documents, and pushing a control button associated with the interface controller, selecting an interactive execute item, or otherwise providing an execution command. Upon receipt of such an execution signal, the processor(s) can provide to one or more output device(s) data useable by the output device(s) for outputting the one or more documents in human-readable form.

In further aspects or embodiments the invention provides computer memories communicatively linked to processors such as client computer systems and to output devices, the memories comprising computer readable media representing form data useable for compiling, in combination with content data received from the client device, data useable for outputting one or more documents according to at least one predetermined format. Such form data can comprise any data useful in outputting such documents, including for example type fonts and size information; page size, margin, and other formatting information; and standardized text and images used in preparing or identifying the documents, such as letterheads, logos, and form paragraphs in contracts, notices, and other documents.

In other aspects, the invention provides computer-usable media comprising computer readable code embodied therein for causing computers or other automatic data processors to execute commands in conformance with the processes disclosed herein.

Methods, apparatus, and programming according to the invention can be used to cause multiple documents to be output simultaneously, using minimized numbers of command input signals, with significantly reduced demands on data transfer and communications systems. Output of documents in accordance with the invention can significantly reduce the amount of data processed by and/or transferred between servers, client systems, and output devices such as computers, and can save users of such devices significant amounts of time and trouble in obtaining output of documents.

As will be apparent to those skilled in the relevant arts, once they have been made familiar with this disclosure, and as further disclosed herein, content data comprises any information desired to be output in one or more documents that is specific to a particular document or set of documents related to a specific transaction, or otherwise designated as serving a specific purpose in a document. Content data can include static data specified by a user of an interactive input process or provided to a processor in disk, database, tape, card, or other batch form, including both text and images, or dynamic content of any compatible form, including for example changeable text matter or audio or video data, including for example data provided in flash, .mpeg, or .wave, or other formats.

As will further be apparent to those skilled in the relevant arts, once they have been made familiar with this disclosure, and as further disclosed herein, form data can comprise any data useful in outputting such documents, including for example type fonts and size information; page size, margin, punctuation, column, page numbering, and other formatting information; and standardized text and images useful in preparing or identifying the documents, such as letterheads, logos, and form paragraphs in contracts, notices, and other documents. Form data can include static and/or dynamic useful in compiling a form, including for example text and images, or dynamic content of any compatible form, including for example changeable text matter or audio or video data, including for example data provided in flash, .mpeg, or .wave, or other formats.

As will further be apparent to those skilled in the relevant arts, once they have been made familiar with this disclosure, and as further disclosed herein, predetermined (i.e., preselected or otherwise desired) formats can comprise any specific or general forms contemplated for use in outputting documents. For example, predetermined formats can include specific sizes, sequences, relational juxtapositions, or formats of text, images or other information used in presenting a document intended to be comprehensible to a human user.

As further disclosed below, it can be advantageous in some circumstances to provide documents in predetermined format(s) using data sets that are at least initially application-, or format-, neutral. That is, in forms which are immediately interpretable (i.e., "native") to an intended output device, and/or easily translatable by output programs or devices into any desired format for further output processing. Thereafter, the format-neutral document(s) can be translated into any desired formats, such as, for example, Word™-compatible .doc formats, Adobe .pdf format, jpeg, .gif, etc. Format-neutral output can include, for example, stream of data that are interpretable, with or without further processing by printers or other output devices. One format that has proved particularly useful in present embodiments is the well-known PCL open-document format. For purposes of this disclosure, "application-neutral" and "format-neutral" are synonymous.

As will further be apparent to those skilled in the relevant arts, documents, for purposes relevant to this disclosure, can include any physical or virtual documents, including printed or printable documents, images, etc.

Systems, methods, and programming code according to the invention are suitable for use in outputting all types of documents, particularly where output of multiple documents is desired, the documents being prepared based on a shared set of content data.

One application in which systems, methods, and programming according to the invention may be particularly useful is where the output documents are to be retained as evidence of acceptance, acknowledgement or other action by a user of the documents, as for example where the documents are to be signed or otherwise witnessed or authenticated. Such evidence may be provided for example, in the case of a physical document such as a set of papers, by physical written signature or, in the case of electronically-maintained documents, by electronic representations of such signatures or by association of the output document data sets with security devices such as biometric access controls. Such biometric access controls can include, for example, fingerprint readers/records, voice recognition data/equipment, retina scans, etc.

One industry in which systems, methods, and programming according to the invention may be applied with particular advantage is the financial services industry. For example, transactions pertaining to loan or credit applications, the issuance or transfer of securities, the opening and/or management of accounts such as savings or checking accounts, the establishment and transfer of shares in mutual funds or other real or personal property, the preparation, issuance, and maintenance of insurance policies all typically involve the preparation of multiple documents based on sets of content data which may advantageously be shared between the documents. Such shared information can include, for example, names and other identifiers associated with account holders, lenders, borrowers, securities issues, etc., which must appear in multiple documents. The invention offers significant improvements in the preparation and control of such output documents.

Many of the advantages afforded by systems, processes, and programming according to the invention will be made apparent in the disclosure which follows.

BRIEF DESCRIPTION OF THE FIGURES

The invention is illustrated in the figures of the accompanying drawings, which are meant to be exemplary and not limiting, and in which like references are intended to refer to like or corresponding parts.

FIG. 6, consisting of FIGS. 6A, 6B (consisting of FIGS. 6B1-6B7) and 6C, is a listing of processing instructions useful in causing a processor to implement processes in accordance with the invention.

FIG. 8 is a schematic diagram of a document output in accordance with the invention.

FIGS. 9 and 10 are schematic diagrams of user interfaces suitable for use in implementing processes according to the invention.

DETAILED DESCRIPTION OF THE PREFERRED EMBODIMENTS

Preferred embodiments of methods, systems, and apparatus according to the invention are described through reference to the Figures.

Figure 1:
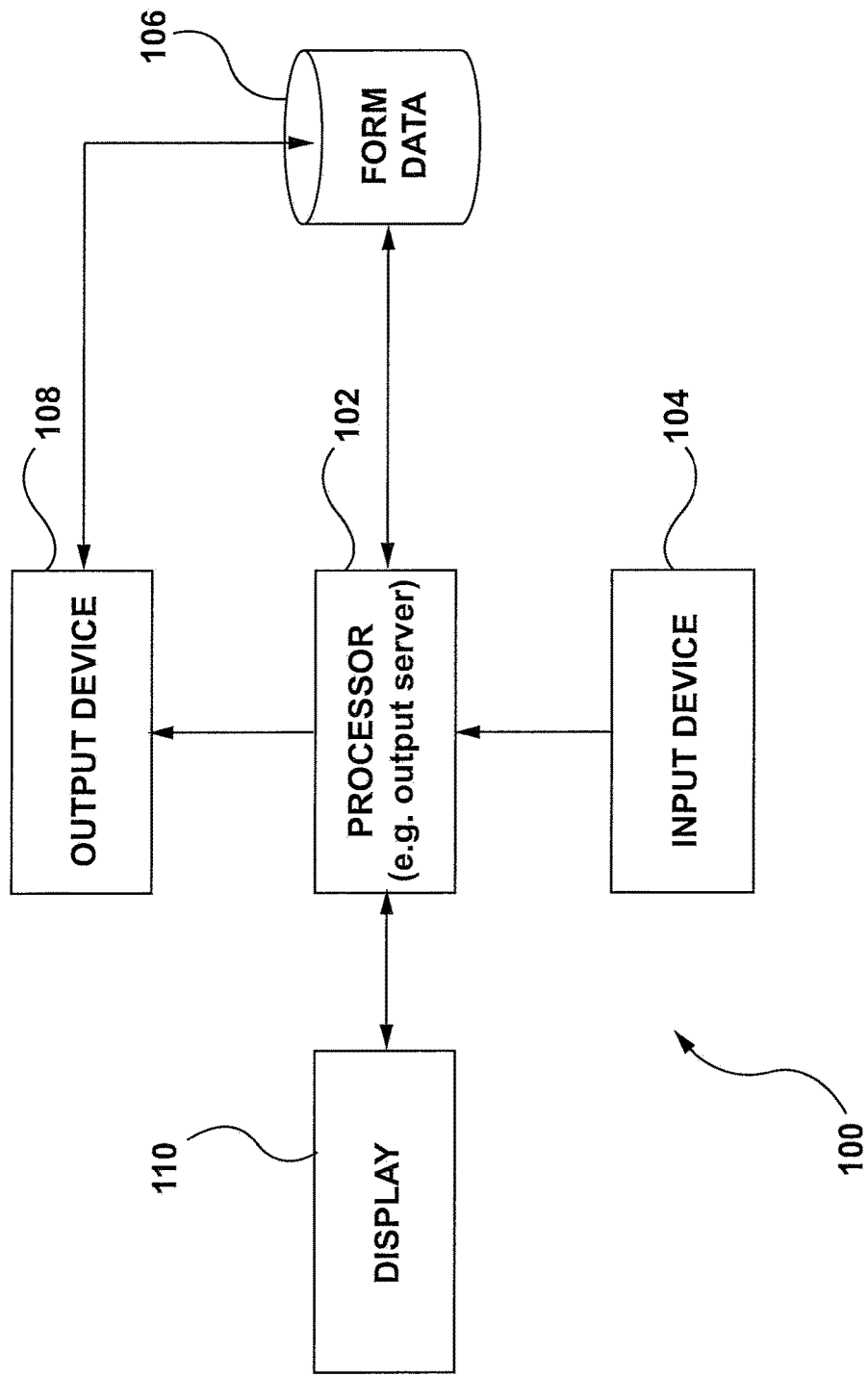
FIG. 1 is a schematic diagram of a system suitable for use in implementing the invention.

FIG. 1 is a schematic diagram of an example system architecture suitable for use in implementing systems and output processes according to the invention. In the example shown, system 100 can comprise one or more each of output server(s) or other processor(s) 102, input device(s) 104, form data store(s) 106, output device(s) 108, and display device(s) 110.

Output server(s) or other processor(s) 102 comprise, execute, operate, or are otherwise associated with programming and/or data processors adapted for communication with one or more of input device(s) 104, form data store(s) 106, output device(s) 108, and display device(s) 110; and for control of output and other data processes performed thereby. A wide variety of digital processors and computer programming are suitable for use in implementing output servers and other components of the invention, including for example processors such as those incorporated within modern stand-alone or networked computer systems, operating a wide variety of suitable control or operating system software. For example, systems and processes according the invention may readily be implemented using PC-, desktop-, laptop, server-class, personal digital assistant (PDA), and/or mainframe-class computer systems using Windows®, Linux, and/or other operating system software. Output servers can be implemented by or as computer programs or program modules stored on and/or executed by multi-purpose computer systems, such as for example suitably-configured output control application programs running on PC or workstation class computer systems. A wide variety of such processors, application programs, and control and/or operating software systems suitable for use in implementing the invention are now commercially available, and others will doubtless hereafter be developed. The selection of suitable devices and control or operating systems will not trouble those skilled in the relevant arts, once they have been made familiar with this disclosure.

Input device(s) 104 can include any input devices compatible with the objects and processes disclosed herein, including for example computer keyboards, pointing devices such as mouses (mice) or trackballs, and tape, disk, or card readers. In general, such devices include any devices suitable for use in providing to output server 102 and other processors data and preferably also execution and other command signals useful in preparing forms and other documents for output processing. Such input devices can be linked directly to output server(s) 102, or indirectly, as for example through networking of client systems such as PCs or workstations communicatively linked to output server systems via local or wide area networks, and/or public networks such as the Internet.

Data signals provided by input device(s) 104 can comprise signals representing content useful in outputting or otherwise preparing forms or other documents, as well as command and execution signals. As will be understood by those skilled in the relevant arts, a wide variety of forms and other documents are used in business, government, and other forms of commerce. For example, in completing a loan application a bank or other financial services provider can require the preparation of one or more forms useful in executing and memorializing the loan and related notices and records. Such forms typically include both information which relates to the particular matter pertinent to the forms, and information which is generalized, such as form paragraphs, instructions, etc. Such forms are also frequently intended to be presented, upon completion, according to specified, predetermined formats.

The completion of such forms typically involves the "filling in" of, or provision of content data for display within, certain fields, or, as they are sometimes called with physical forms completed by hand, typewriter, etc., "blanks". Such fields or blanks correspond, in general, to desired dispositions of content data with respect to other content and form data in compiled and/or output documents, so that the data can be appropriately recognized and processed.

In their physical or virtual forms, such documents can comprise fields or blanks in which data representing a wide variety of information is intended to be placed. For example, such forms may have spaces for setting out an applicant's name, address, and other identifiers; terms such as a principal amount of a loan to be established, or a limit to be applied to a line of credit, or one or more interest rates or interest rate benchmarks; payment and default dates and rules; and the like. Data signals representing such information are included within the meaning of content data.

Thus, as will be understood by those skilled in the relevant arts, in some embodiments of the invention content data corresponds to data provided by an individual or accessed from an existing data store which is specific to one or more particular transactions or matters with relation to which one or more documents is to be completed, as opposed to form data, which is used for example in establishing and controlling the format and appearance of output documents.

Form data store(s) 106 can include any form(s) of volatile and/or persistent memory, or combination(s) thereof, suitable for storing data useful in completing, in combination with or without content data, one or more forms, which data is, in general, employed pursuant to one or more protocols, formats, templates, etc., which are of general applicability, and not generally specific to individual transactions or matters. For example, a not uncommon means of completing forms at present is to cause a computer to display an image constructed using suitable form data and corresponding to a form containing blanks for the input of content data pertinent to one or more matters, and, within such blanks, provide interactive data input fields, by means of which a user of a computer may use one or more input devices to input corresponding content data. Known examples of such forms include "fillable .pdf" forms.

Output device (s) 108 can include any processors, printers, memories, or other devices, including where applicable any associated processors or other components, together with associated software or firmware, suitable for use in implementing the systems and processes disclosed herein. Such devices can include, for example, printers; facsimile machines; e-mail servers, programs, memories, or other devices; instant messaging servers, programs, memories, or other devices; any variety of multi-function output devices, and/or any other suitable devices.

Display device(s) 110 can include any devices suitable for providing interactive user interfaces suitable for use for implementing the processes and systems disclosed herein. Display devices 110 can include, for example, cathode ray tube, liquid crystal diode, light emitting diode, plasma, or other screens, together with suitable input and control devices such as keyboards or keypads, mice, trackballs, and/or other pointing and selecting devices, and suitable control programming A wide variety of such devices are now available commercially, including for example, a very large number of computer display screens provided together with mice, trackballs, etc., and Linux, Windows®, and other operating system software.

Thus for example system 100 can comprise a single desktop computer system associated with an input device such as a keyboard, a display such as a graphic display screen, a disk or other memory storage device, a printer or other device, and one or more pointing and selecting devices such as mice, executing suitably-configured software. System 100 can also be implemented, as disclosed herein, using networked or otherwise communicatively-linked systems of computers, such as application servers and client workstations, together with associated peripheral devices such as printers, display screens, etc. and suitably configured software systems.

As used herein, the term "server" can include either a physical machine comprising one or more processors, an instance of a program or application running on a machine, or any combination thereof.

Figure 2A:
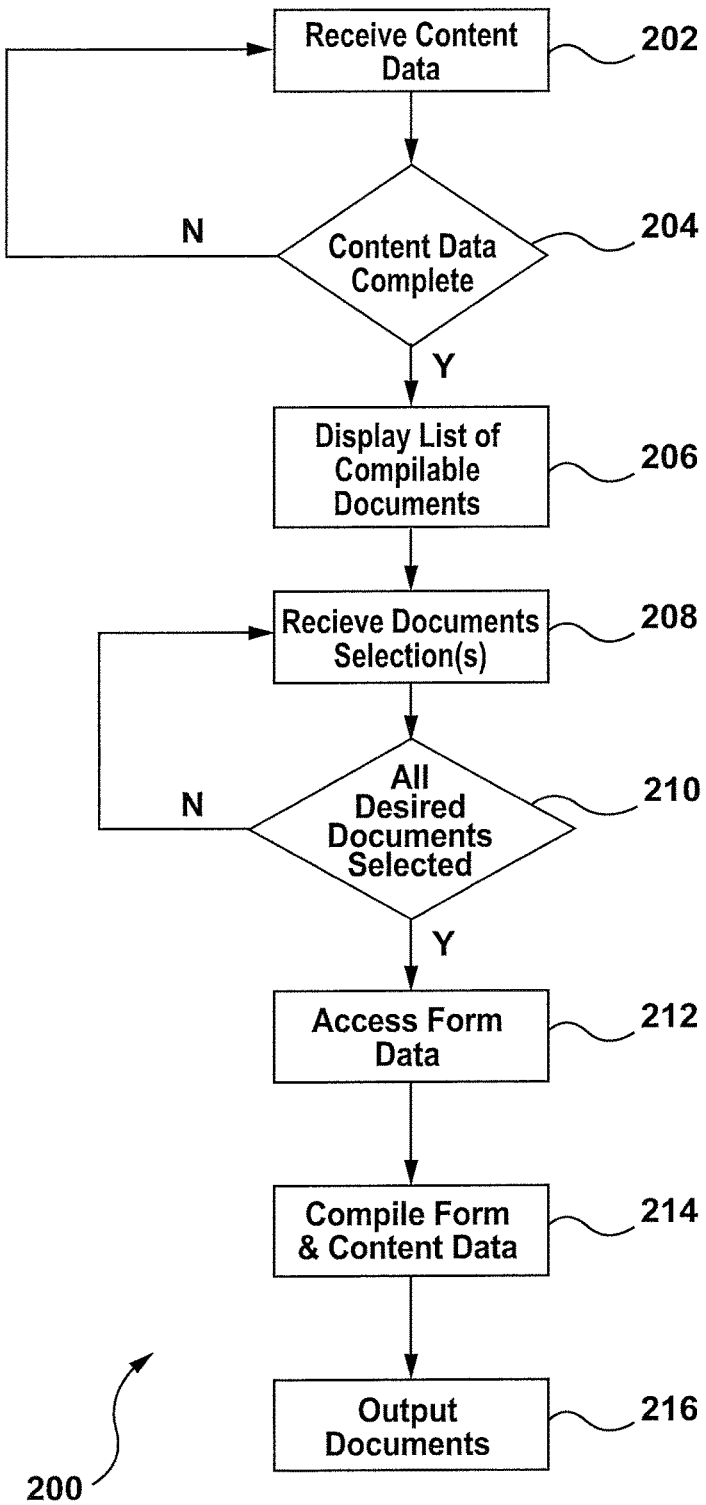
FIGS. 2A and 2B are schematic flow diagrams of processes for controlling printing and other output processes according to the invention.
Figure 2B:
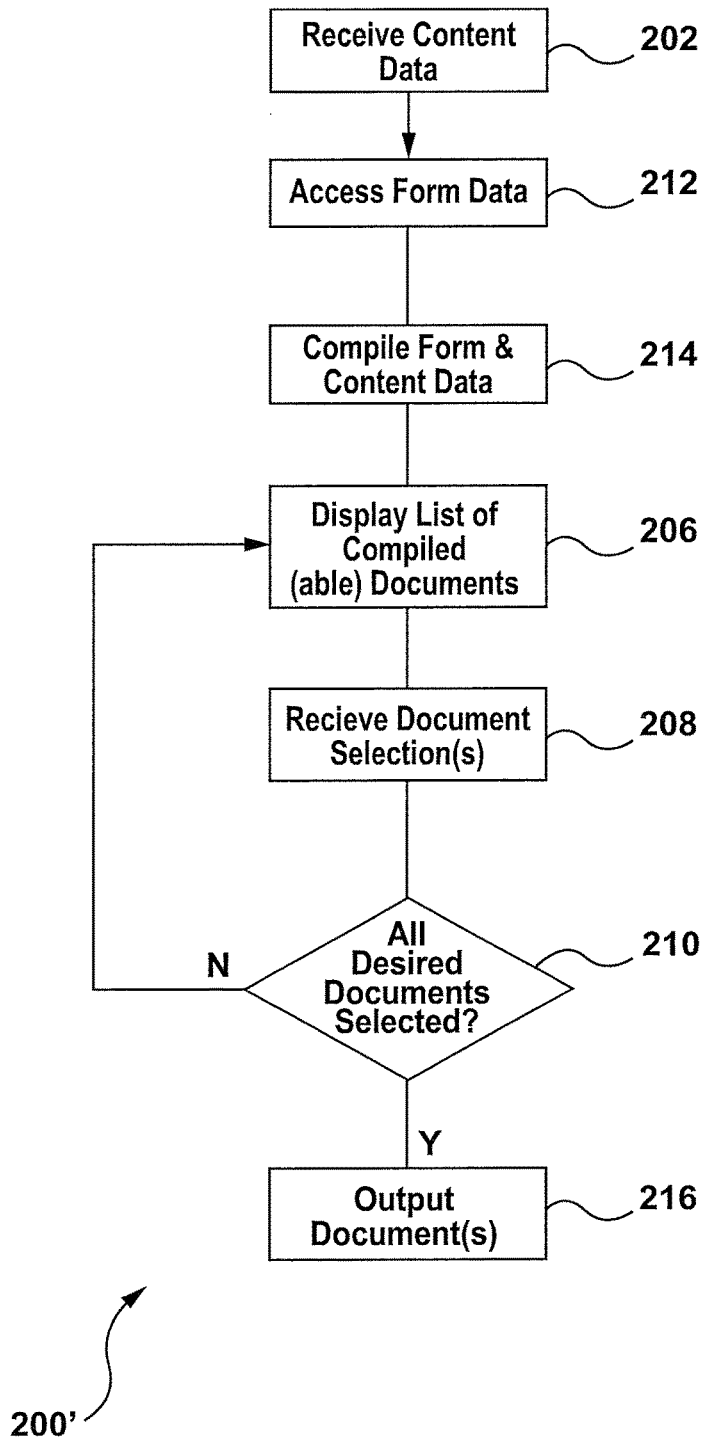

FIGS. 2A and 2B are schematic flow diagrams of an example process for controlling printing and other output processes according to the invention. Process 200, 200' of FIG. 2A, 2B is suitable for implementation using any of the architectures disclosed herein, and any other architectures suitable for use in implementing the processes described herein, including for example the architectures shown in FIGS. 1 and 3. For purposes of illustration, and for such purposes only, process 200 is described with reference to the components 102, 104, 106, 108, 110 of system 100 as shown in FIGS. 1 and 3.

Figure 3:
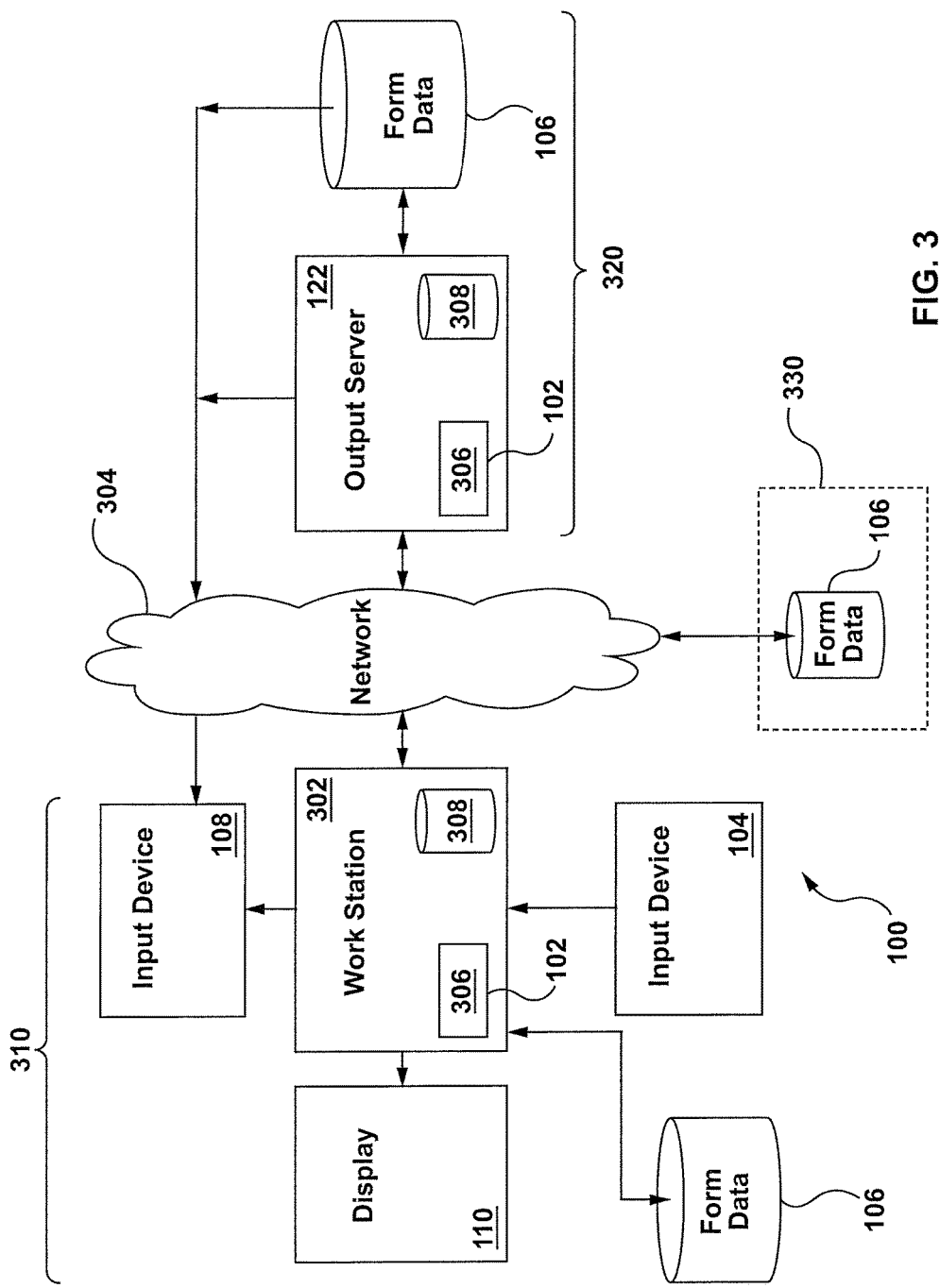
FIG. 3 is a schematic diagram of a system suitable for use in implementing the invention.

FIG. 3 is a schematic diagram of a system architecture suitable for use in implementing systems and processes according to the invention. System 100 as it is shown in FIG. 3 can be interpreted as an embellishment or more comprehensive or specific depiction of the illustration of system 100 shown in FIG. 1. In the form illustrated in FIG. 3, processor 102 is comprised by either or both, using for example known distributed processing techniques, of client workstation 302 and/or output server 122. System 300 as shown in FIG. 3 includes one or more client systems 310, which include workstation(s) 302 which are communicatively linked to corresponding displays 110, input devices 104, and output devices 108. Client system(s) 310 may be communicatively linked to server system 320 directly or via any suitable form of network 304, including for example local- or wide-area networks, and/or public networks such as the Internet.

For clarity, it is shown that client workstation(s) 302 and output server(s) 102 comprise one or more corresponding processors 306 and local memories 308. Local memories 308 can include persistent and/or volatile memories such as random access memories, processing buffers, and local hard- or portable drives such as CD or floppy disk drives.

Network 304, as will be understood by those skilled in the relevant arts, can comprise any one or more of a wide variety of firewalls and other security devices, many of which are well known, and available commercially, and others of which will doubtless be developed in future.

At 202 in the processing flow illustrated in FIGS. 2A and 2B, a processor 102 such as a work station 302 receives from an input device 104 content data suitable for use in preparing one or more documents. As previously discussed, such content data can include, for example, facts or other data pertinent to a specific transaction, such as a loan application, product specification, transfer of real or personal property, government filing, or course of proposed medical treatment, or other input by a user of a stand-alone or client system such as a desktop computer, using a keyboard.

Such content data can be provided in any suitable batch form or on an intermittent or continuing basis, e.g., through an interactive process executed by an application running on a client workstation 302 or an application server. For example, such content can be provided by a user of a workstation 302 in response to prompts provided by an application running on a user workstation 302, or on a remotely-located application server, incorporated or otherwise associated with, for example, a remote output server 102, via an interactive user interface adapted for eliciting input of pertinent or desired data. For example, an application or application server can cause a graphical user interface to be presented to the user on the display screen 110 of a client workstation 302, the interface comprising one or more interactive graphical fields adapted to provide a specific type of data, such as a name or date, associated with an input field such as box displayed according to a Windows®-style protocol. Using one or more pointing and control devices such as a mouse or trackball with associated control switches, the user can select the appropriate field(s) and, using a keyboard, input desired data. Command or execution signals causing the application server or other processor to read the data from the input field can be provided by activating a control switch associated with the keyboard or pointing device.

Figure 4:
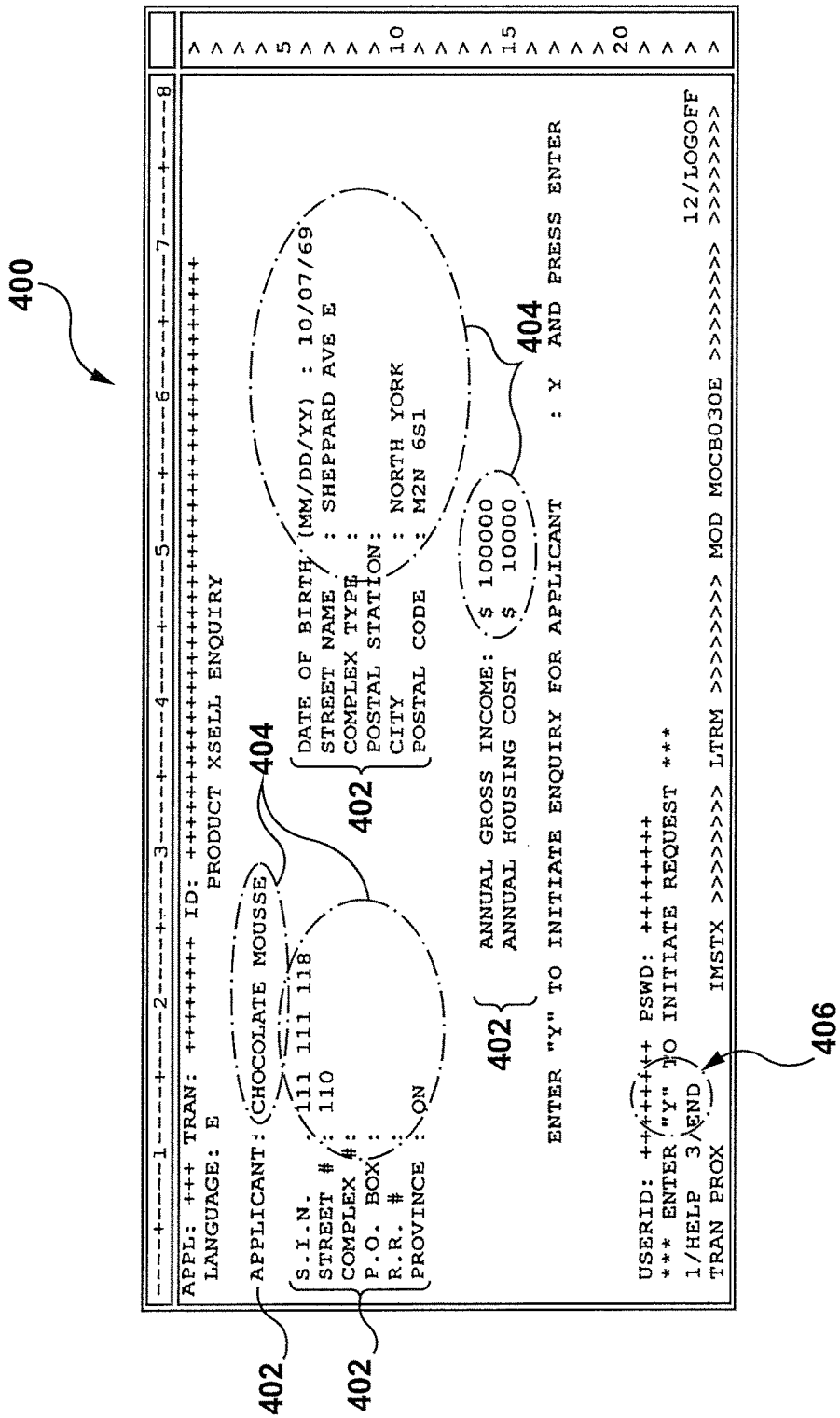
FIGS. 4 and 5 are schematic diagrams of user interfaces suitable for use in implementing processes according to the invention.

An example of a suitably-adapted user interface 400 is shown in FIG. 4. In the example shown in FIG. 4, a processor incorporated by or otherwise associated with, for example, a client system workstation 302 or remote server 102 executing a "Product Xsell Enquiry" application useful for gathering data useful in preparing documents relating to a sales transaction, has provided to a display 110 control and data signals adapted for causing the display 110 to present to a user of the corresponding system an interactive user interface screen 400. Interface 400 comprises a number of descriptive text items 402 displayed in logical association (as for example in grammatical or visual combination or juxtaposition) with input fields 404, including for example text items 402 "Applicant", "S.I.N.", "Street #", "Date of Birth", "Annual Gross Income", etc. and corresponding input fields. Text items 402 and their corresponding input fields 404 are adapted to elicit from the user the input at fields 404 data identified by the corresponding text items 402, so that, upon input of a suitable control signal, the processor 102 that caused the display of the interface 30 can read the input data and store it in one or more of associated volatile or persistent memory(ies) 308.

In the example shown, a user has used a pointer, keyboard, and/or other suitable control devices to select appropriate input fields 404 to input content data items "Chocolate Mousse", "111 111 118", "110", "10/07/69", and "100000", respectively using, for example, Windows® "point and click:" or other suitable operating protocols.

As will be understood by those skilled in the relevant arts, any suitable method(s) of providing content data may be used in implementing the invention, alone or combination. For example, in addition to or in lieu of the interactive methods described above, batch input methods such as card- or tape reading, or accessing of previously or automatically-compiled databases may be used.

Moreover, content data intended for use in preparing forms can be collected for a series of forms sequentially, or collectively for a plurality of forms to be prepared simultaneously. For example, a client workstation system 302 can be used to interactively collect a set of content data required for outputting a plurality of forms. The data may be stored locally until a desired complete data set has been collected, at which point the content data may be provided to, or made accessible to, an output server 122 for further processing.

At 204 a determination is made as to whether all desired content input has been input by the user and/or received by the processor 102. For example, an interactive input application can execute a loop waiting for input of further content data until such time as a user enters a suitable command signal which causes the processor 102 to stop accepting further input and to move to other processing, or to pass a gathered data set to another processor such as an output server 122 for further processing. The determination made at 204 can be interpreted as indicating that a desired content data set has been stored in volatile or persistent memory(ies) such as memories 308.

For example, by entering a command or execution signal "Y" in response to prompt 406 in FIG. 4, a user of a processor 102 can instruct the processor that all or any desired portion of the content data input has been completed.

When a desired content data set has been received, at 206 the processor(s) 102 can cause a display 110 associated with, for example, a client workstation 302 to display a list of documents that are available to be compiled using the gathered content data. For example, the processor(s) 102 can determine which of a corresponding set of documents are available for compilation, either by association with a desired process or on the basis of minimum content requirements for compilation of the documents.

For example, in a process for preparing documents related to a consumer or commercial loan transaction, an application executed by the processor(s) 102 can determine which of a selected set of documents is appropriate for compilation using the received content data, or otherwise available for printing. For example, a data record or data set comprising a number of identifiers associated with documents required for completion of a the loan (or an extension of credit, the issuance of a series of securities, or the transfer of real or personal property) can be accessed by the computer, each of the identifiers being further associated with data sets representing form data useful in outputting such documents, particularly when compiled with the received content data.

Figure 5:
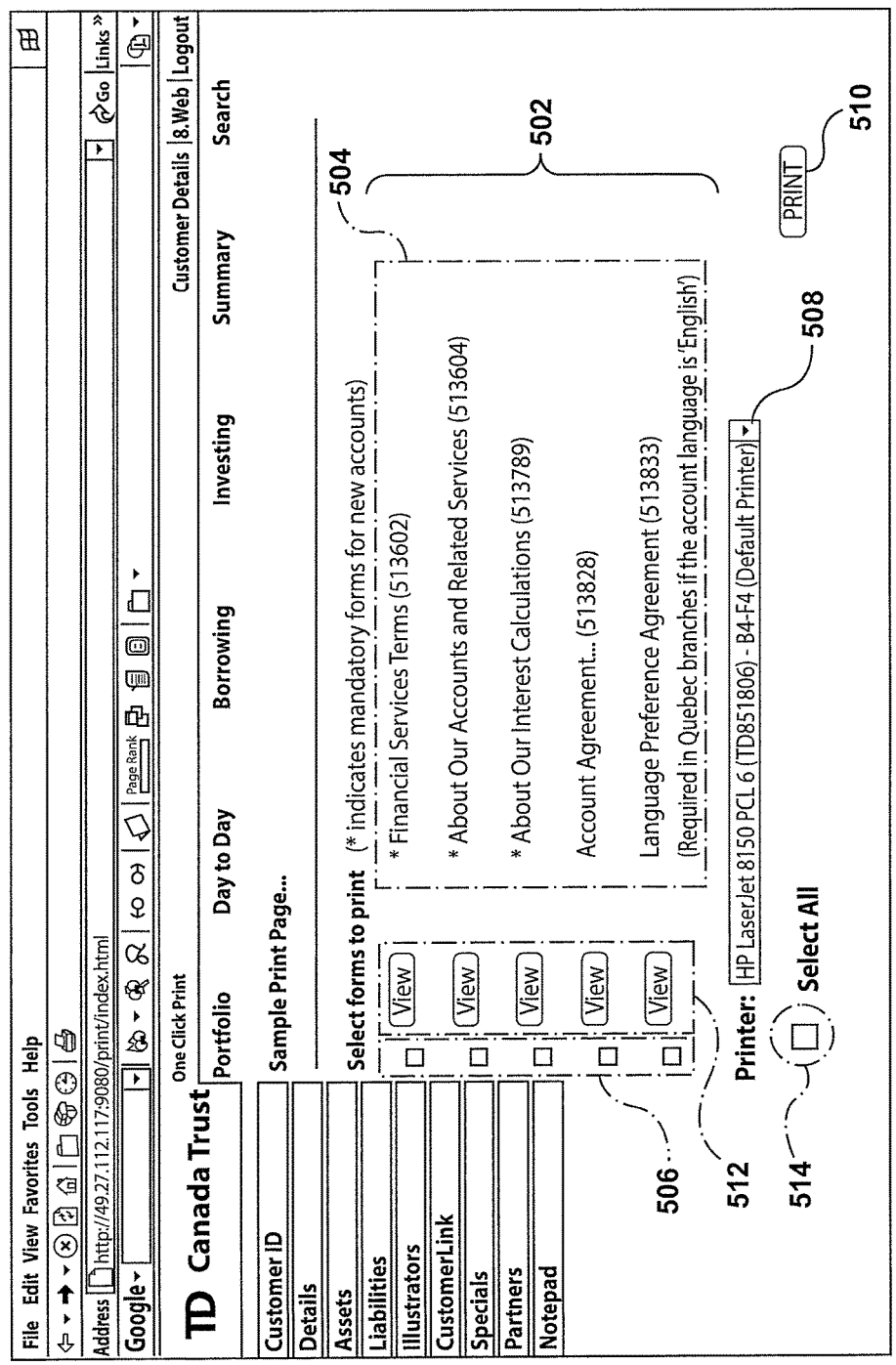

An example of an interactive user interface suitable for use in controlling such a process is shown in FIG. 5. Screen 500 of FIG. 5 comprises a list 502 of documents compilable using content data received at 202 related to a loan transaction. Titles of corresponding documents are shown at 504, together with corresponding selectable items 506. Selection of one or more of items 506 using suitable controls such as mice, trackballs, or other graphics-based input control devices can cause one or more of processor(s) 102 to create and/or receive, as appropriate, control signals useful for designating one or more of documents 504 in list 502 for compilation and subsequent printing or other output processes. A selectable item 514 useful for designating all listed documents for compilation, and other suitable command items, can be presented.

A wide variety of other output control processes can be provided. For example, one or more selectable items 512 can be provided, to enable a user of the display 110 to send control signals to the processor(s) 102 to cause the display to present one or more compiled documents in a manner such as that in which it might be printed or otherwise output, for review and possible correction, storage, and other further processing; and for example at 508 a list of available output devices, such as printers, facsimile or e-mail servers, etc., can be provided.

When the user is satisfied that all desired compilable documents have been selected, at 210 he/she can cause a suitably-adapted control signal to be provided to the processor(s) 102 controlling relevant portions of the compilation/output process; and at 212 processor(s) 102 can access form data in one or more form data stores 106. Form data stores 106, can be of any suitable type and can be located in any desired association with respect to output server 102, and can be accessed in any suitable manner. For example, as shown in FIGS. 1 and 3, form data store 106 can be directly or communicatively linked to output server 102, and can be read by a processor 102 associated with an output server 122 and/or a client system 302, etc., using well-understood data read functions. Alternatively, or in addition, one or more such form data stores can also be incorporated as a part of a client system 310 or provided by a third-party system as shown at 330, and accessed accordingly.

For example, upon selection of a selectable item 510 by a user and subsequent receipt by the processor(s) 102 of a suitably-adapted execution command signal, the processor(s) 102 can access a form data store 106 to read or otherwise retrieve data useful in compiling any one or more of the forms 504 "Financial Services Terms (513602)", "Account Agreement (513828)", etc. in list 502.

With desired form and content data accessible, at 214 processor(s) 102 can compile the form and content data to produce one or more compiled data sets comprising data records suitable for use in printing or otherwise outputting the compiled data in the form of one or more documents.

Compilation of form and content data to provide compiled document output data sets suitable for use in printing or otherwise outputting compiled data in the form of documents can be accomplished in any way or ways compatible with the purposes disclosed herein. For example, content data can comprise one or more data records including text and/or image content, together with identifiers useable by output or other applications for identifying a type, class, or form of the content; while form data can comprise data records including any suitable information for specifying the arrangement and/or appearance of content and other data and/or information on or in an outputted document. Compilation may be accomplished by any means suitable for merging or otherwise placing the content and form data into a single data set (e.g., a string of data records, one or more sets of data files, etc.) useable for causing an output device to produce a document in human-readable form.

An example of coded commands 600 useful for providing computer-readable programming instructions suitable for use in the compilation of a document output data set in the Extensible Mark-Up (XML) language is shown in FIG. 6. Coding 600 FIG. 6 provides an example of instructions suitable for use by a processor or processors 103 such as client workstation 302 and/or output server 122 in preparing a compiled document output data set, using suitably-encoded programming instructions implementing processes such as those shown in FIG. 2A. In particular, in the example shown, coding 600 provides an XML Schema Document (XSD) that provides rigor around the submitted data set for a particular form.

At 601 coding 600 of FIG. 6A comprises a set of instructions is shown for defining a reference to be used in further coding shown in FIG. 6B (consisting of FIGS. 6B1-6B7) for identifying an address for content data identifying a customer to be named in a document "By-Law/Resolution" to output by a system 100 in accordance with the invention. In the example shown, the address "f513602" is defined, according to the XML protocol, and associated with a content data item "CL-CUSTOMER-NAME". At 603 it is specified that if such data is not defined at the time of compilation of an document output data set useful in outputting a document "By Law Resolution", then the compilation will fail. In such cases a suitably-worded warning can be output to a user of the system 100, by, for example, causing appropriate data to be displayed on a display 110.

Content data associated with the item "CL-CUSTOMER-NAME" can be created by, for example, reading data from a suitably-adapted input field such as field 402 "Applicant" shown in FIG. 4, and storing such data in one or more of memories 308 in association with an address identifier "f513602".

At 602 in FIG. 6B a header is provided noting for the reference of humans reviewing the data set that the set has been compiled in XML version 1.0, according to International Standards Organization standard ISO-8859-1.

The instructions shown in FIG. 6 for compiling an output data set are suitable for providing output deliverable to a suitably-configured output device 108 such as a printer, facsimile machine, e-mail server, etc., with or without further processing to translate the data set into a format preferred for use by such an output device. For example, the format-neutral output provided by the coding of FIG. 6 may, but need not necessarily, be translated into a format suitable for causing a printer, display, or other output device to output a document using a desired protocol, such as the .pdf protocol. The Portable Document Format (.pdf) is an open file format created and overseen by Adobe Systems, for describing documents in a device and resolution independent fixed-layout document format.

As will be understood by those skilled in the relevant arts, format-neutral refers to a representation of document data which has not been manifested in such form that it is processable only in particular document format, for example, according to .pdf, jpeg, or .doc formats but which is, rather, native to and therefore immediately processable by one or more desired output devices.

At 604 instructions are provided for directing the processor(s) 102 to access form data stored in the form of style sheets containing computer-readable instructions encoded according to the standardized XML protocol, and to use such data in instructing a printer or other output device 108 in outputting one or more documents, using other form and content data, if any, as further specified by instruction set 600.

Beginning at 606 a set of instructions is provided for directing the processor(s) 102 to add to the form data specified at 604 further form data in the form of instructions specifying the page size(s) and margins to be used in outputting physical or virtual documents. For example, in the illustrated example, it is specified at 608 that the form data to be included in the compiled document output set comprises a page size of 8.5.times.11 inches, with margins of 0.333 inches, and with content data merged into the body of the document to be output in "Times Roman" font, using a 9-point type size.

At 610, a series of instructions is provided for causing content data to be merged with both previously-compiled and further-specified form data in such a way as to cause output of a document comprising the specified content data presented according to a desired format. In the example shown, at 612, 614 instructions are provided for causing retrieval of the current content of a data item corresponding to the identifiers "513602" and "CL-CUSTOMER-NAME", and merging of such content data with form data which, upon processing by an output device 108, will cause the current content data associated with those identifiers to be printed or otherwise displayed at a specified location in a document in a font "Times New Roman" in 9-point size type.

As shown in the remainder of FIG. 6, instructions for the merging of various forms of form data with the specified content data are provided. In addition to formatting data such as font sizes, types, and spacings, form data can comprise one or more of items 616 which include textual data. Thus it may be seen that data representing content not specific to a particular transaction or publication of a document or documents can be stored as form data. Alternatively, as will be apparent to those skilled in the relevant arts, such data may be provided by system 100 in the form of content data specified by a user of a client system 310, in batch format, or otherwise, and merged in the manner of shown at 610.

Content data records can also comprise, in lieu of or in addition to interactively or otherwise explicitly-specified content, content data specified implicitly in the form of links to previously or independently defined content, sometimes referred to as dynamic content, which is designated by a user or other source by address, location, or other class identifier. Examples include internal or external memory address links, such as a register address or uniform resource locator (URL). Such identifiers can be used to cause processor(s) 102 compiling document output data sets to retrieve or otherwise access data stored in such locations and to insert such dynamic data into a desired document in a desired location or other desired relation to other content. For example, an image, digital sound reproduction data, or other non-textual content data may be retrieved and compiled such that it appears in an outputted document in a desired location. Moreover, such dynamic content identifiers can be determined at the time of compilation on the basis of any desired parameters, including for example an identifier associated with an individual user or client system, a time of day or date, or any other desired information.

For example, at 618 in FIG. 6B an instruction is provided which provides a reference "tdct.gif" to an independently-defined image data file to be incorporated in the outputted document(s) when displayed. At the time in which the document output data set is compiled, the processor(s) 102 are directed to retrieve from a data store 106 .gif-format image data, and to merge it with content data specified at 620 in order to cause it to be output in accordance with a desired format.

FIG. 6C provides an example of coding suitable for use in causing a processor 102 to associate content data specific to a given output job with a suitable address or other identifier, for use by other portions of coding 600 such as that shown in FIG. 6A in creation of document output data set. In the example shown, the content data "John Doe" is associated with the content item type "CL-CUSTOMER-NAME", for insertion into the compiled document data set at the point specified at, for example, 614 in FIG. 6B2.

Instruction set 600 can be compiled prior to a planned data content collection process such as process 202-204 of FIG. 2A, or, through the use of suitably-prepared programming instructions, can be compiled automatically by processor or processors 102 at the time of data collection and/or desired document output.

Figure 7:
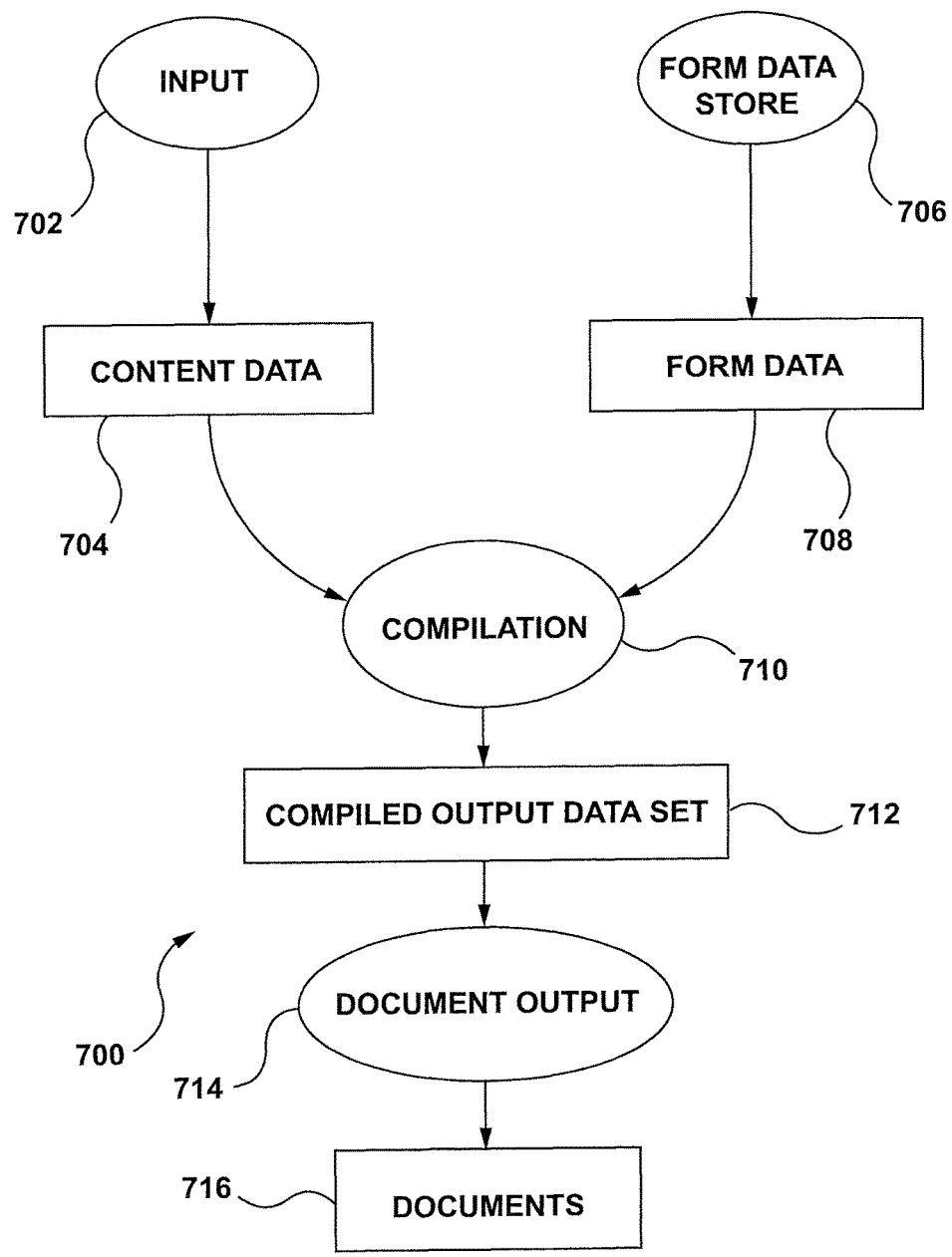
FIG. 7 is a schematic diagram of a process for compiling output data in accordance with the invention.

A process enabled by instruction sets such as instruction set 600 of FIG. 6 is shown conceptually in FIG. 7. At 710 content data 704 derived from input 702 can be merged or otherwise compiled with form data 708 retrieved from form data store 706. Compiled document output data 712 produced at 710 can be output at 714 to produce one or more documents 716. As previously noted, compiled document output data set 712 can be provided in format-neutral form, and prior to output at 714, translated into a format-specific form, as for example through the insertion of suitable data items specified by a desired protocol.

Individual content and/or form data records can be used in outputting documents in as many instances as desired, both within single documents and multiple output documents. Individual document output data sets produced through the processes disclosed herein can be adapted to provide for output arbitrary numbers of output documents, based on arbitrary numbers of uses of such individual data records or data sets. For example, the content data record "CL-CUSTOMER-NAME" referred to at 614 in instruction set 600 of FIG. 6, comprising data representing an applicant's name can be used in an arbitrary number of instances in a single document, or in multiple locations in multiple documents; and instruction set 600 can be adapted to provide for compilation of a document output data set adapted to cause, on being provided to an output device 108, an arbitrary number of documents.

When, as for example by execution of the instruction set 600 shown in FIG. 6, a document output data set has been compiled, at 216 in FIGS. 2A and 2B the compiled document output data set can be provided to a printer or other output device 108 for outputting.

For example, upon execution of an instruction set such as instruction set 600 shown in FIG. 6, a device-readable document output set can be compiled. By routing the compiled document output set to a printer 108, one or more documents such as document 800 shown in FIG. 8 can be produced.

In the example shown in FIG. 8, document 800 comprises a printed record of a content data item 802 "John Doe". The remaining items appearing on the printed document are printed records of form data items, including for example form data item 804 corresponding to the .gif-format image file referenced at 618 in FIG. 6B1, and text form data items 806, 808, 810, 816, 818, 820, 822, 824, corresponding to text items referenced at 626, 628, 630, 632, 634, 636, 640, 642 respectively.

In the example shown, the text content data "John Doe" may have been entered by a user of an input device 110 associated with a client workstation 302, and thereafter made available to an output server 122 and merged by a processor 306 of output server 122 with form data records corresponding to text form data items 806, etc., in conjunction with formatting information adapted to cause the output of one or more documents containing such form and content data such as document 800 of FIG. 8.

Figure 9:
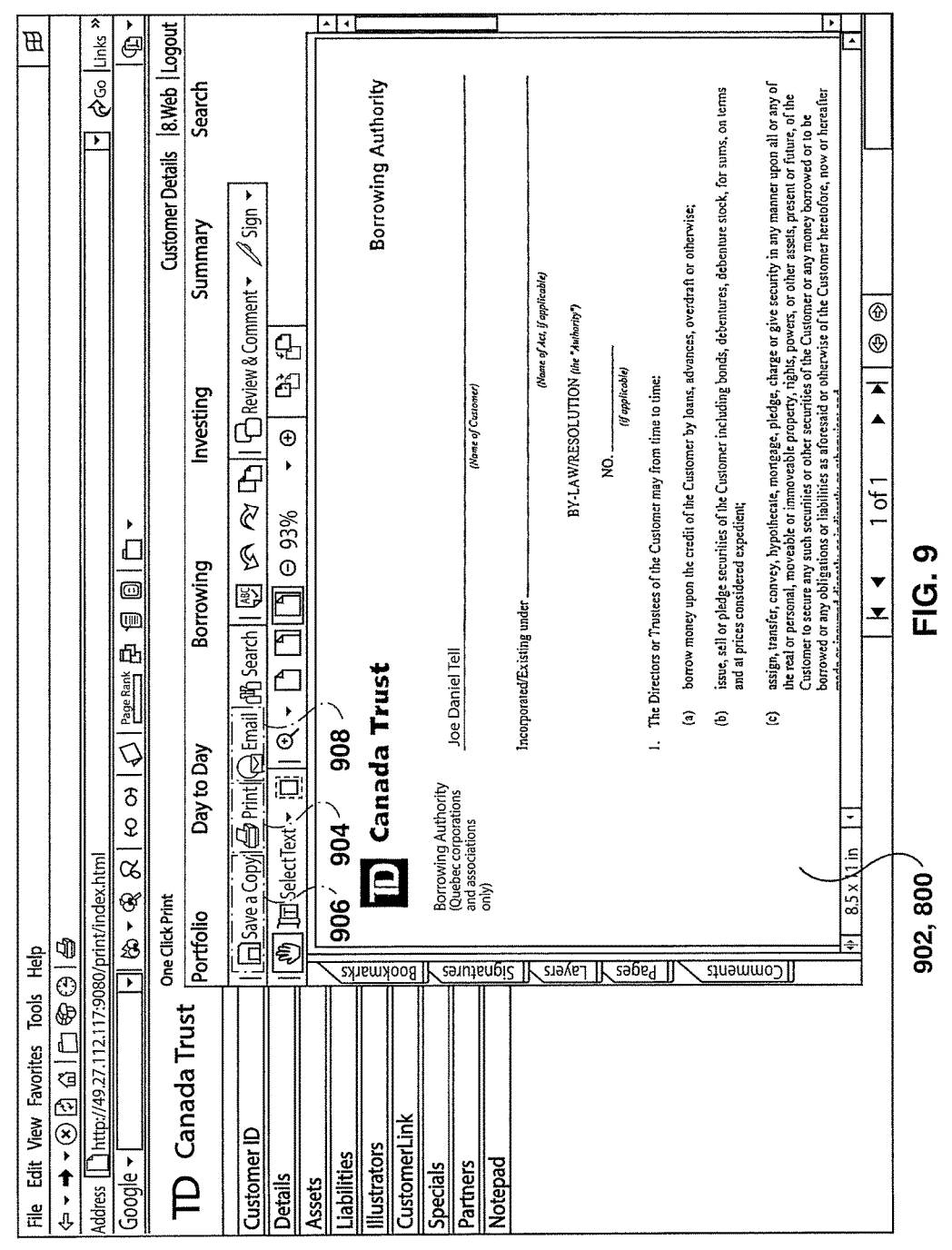
Figure 10:
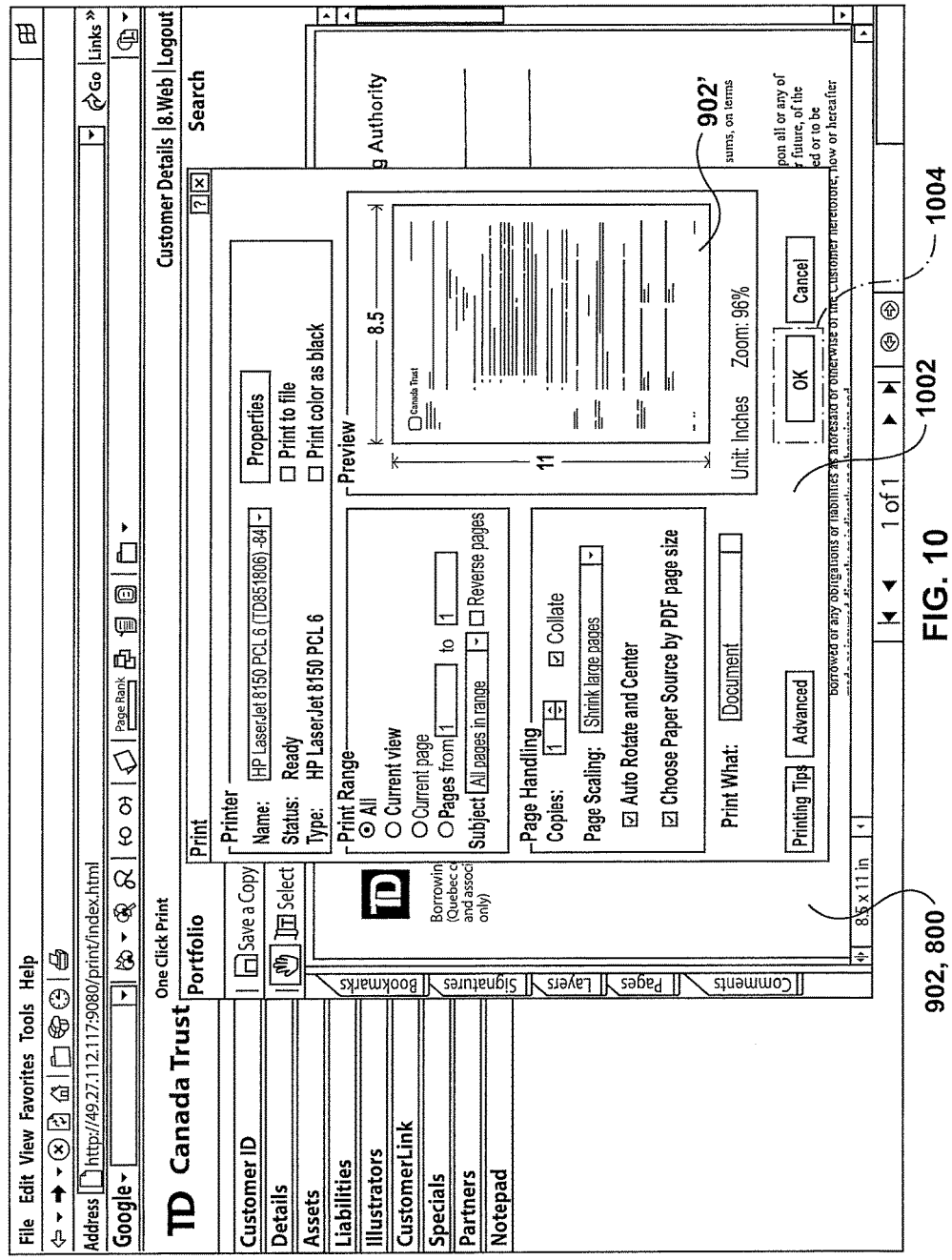

An example of a process for outputting documents using compiled document output data sets in accordance with the invention is shown in FIGS. 9 and 10. Referring for example to FIG. 5, a user of for example a client workstation 302 can review a list 502 of outputtable documents using a display 110. By selecting with a suitably-adapted control device an interactive command item 512 corresponding to a compiled or compilable document output data set for a document such as "BY-LAW RESOLUTION" 800 shown in FIG. 8, the user can cause the display 110 to display an image 902 of a virtual copy of document 800, using a document output data set compiled using an instruction set such as set 600 of FIG. 6. For example, selection of the item 512 by the user can cause the client workstation to produce command data signals operable to cause one or more of processors 102, 306 to execute a command set such as instruction set 600 to compile a format-neutral output data set suitable for use in outputting the document 800 according for example to the compilation process shown in FIG. 7, and to convert the format-neutral data set into a form suitable for displaying a virtual image of the document on a display device 110 in accordance with .gif, .pdf, jpeg, or other protocols.

Moreover, the virtual image 902 of document 800 can be presented in such a manner as to enable the user of the client workstation 302 or other processor 102 to perform other functions using the corresponding compiled document data set. For example, as shown in FIG. 9 any number of document-processing functions associated with the Windows®, Adobe, or other known programming and operating systems can be enabled. For example, by selecting a "save a copy" command item 906, the user can cause the compiled document output data set to be saved in any desired format, neutral or otherwise. By selecting "e-mail" command item 908, the user can cause the compiled document output data set to be output to an e-mail application, for forwarding to a desired e-mail address, or other desired processing. If for example the user selects "print" command item 904, the user can cause the client system 310 and/or output server system 320 to execute a printing process including, for example, causing a suitably-adapted print control interface 1002 to be displayed, as shown in FIG. 10. Print control interface 1002 enables a user of the system(s) 310, 320 to review a virtual copy 902' of document 800, and to perform various other print control functions, using a suitably-configure input control device. A variety of suitable print control interfaces are known, and commercially available, including for example through the Microsoft Windows® operating system.

Selection of "OK" control item 1004 in FIG. 10 can cause the system(s) 310, 320 to output the compiled document output data set to a printer, resulting in printing of a document 800 as shown in FIG. 8.

It is important to note that processes and systems according to the invention are quite adaptable, and are suitable for implementation according to a wide variety of configurations.

For example, it may be noted by reference to FIGS. 1 and 3 that many of the components of system 100 may be communicatively linked, or otherwise associated with each other, according to a wide variety of architectures consistent with and suitable for implementing the disclosure herein. For example, form data store 106 and output device 108 can be accessed and/or controlled by either of workstation 302 or output server 122, or both, in a wide variety of combinations.

As a further example, methods and processes according to the invention may be implemented in a wide variety of forms. In particular, many of the individual steps or stages of such processes can be accomplished in various orders; any order consistent with the purposes described herein will serve. As a particular example, an alternative form of the process for controlling output processes shown in FIG. 2A is shown in FIG. 2B. In the embodiment shown in FIG. 2B, content data is collected in batch form, either by reading an interactively-input data set or by reading a tape, database, or otherwise accessing a previously-gathered data set, and form data related to one or more corresponding forms is accessed at 212. Thereafter the form and content data are compiled to create a document output data set at 214, upon which at 206 a list of documents available using the compiled data set is provided, with selection and output of desired documents occurring at 208-216.

Thus, as will be apparent to those skilled in the relevant arts, a wide variety of variations of systems, architectures, processes, and programming structures are suitable for use in implementing the invention.

Further examples of architectures for systems 100 suitable for use in implementing the invention are shown in FIGS. 11A-11C and 12.

Figure 11A:
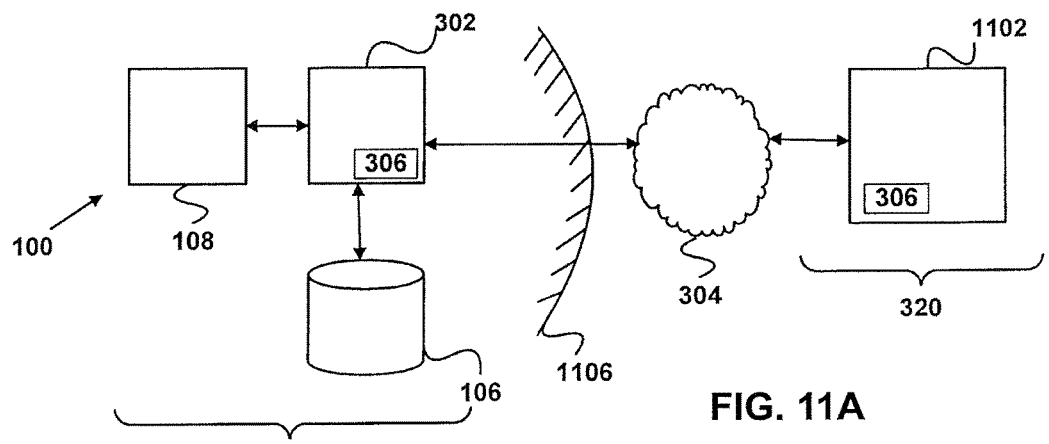
FIGS. 11A-11C and 12 are schematic diagrams of systems suitable for use in implementing the invention.

In the example shown in FIG. 11A, both form data store 106 and output device 108 are communicatively linked directly to client device 302, as for example behind a common firewall or other security system 1106, and controlled by client processor 306. Server system 320 comprises an application server 1102 which can provide, for example interface applications suitable for use in eliciting from a user of client system 310 content data input for use in compiling document output data sets in accordance with the invention. Application server can also control, or help to control, any one or more of output device(s) 108 and form data store processes 106.

Figure 11B:
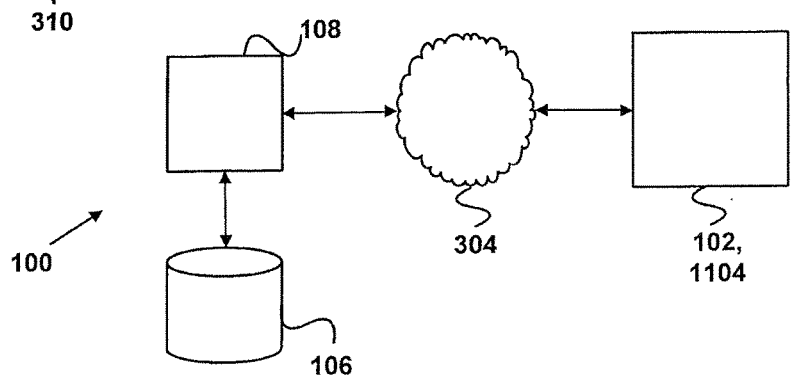

In the example shown in FIG. 11B, output server 102, 1104 controls output device 108 and form data store 106 remotely, as for example in order to control printing at a remote branch of an office, or in broadcast advertising applications.

Figure 11C:
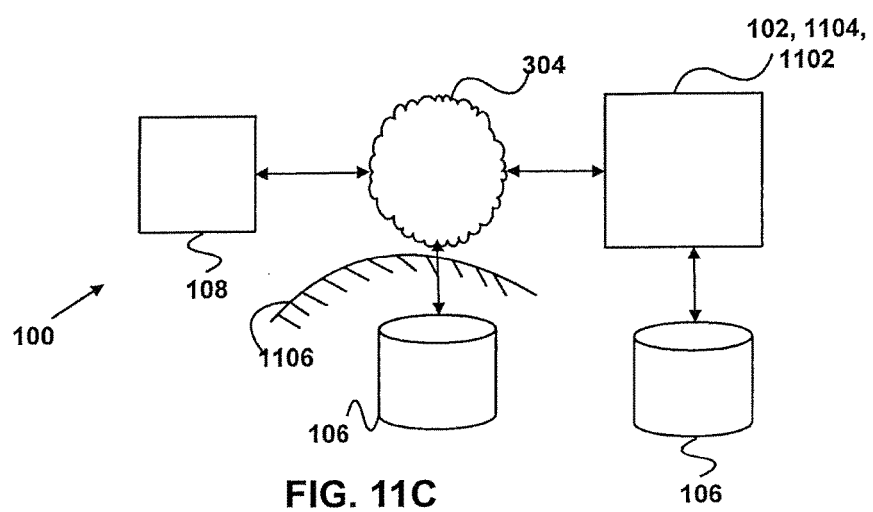

In the example shown in FIG. 11C, output/application server 102, 1102, 1104 controls output device 108 remotely, while form data stores 106 are both controlled directly by the server 102, 1102, 1104, and remotely, as for example where remote form data store 106 is controlled by another entity, or behind a separate security wall 1106.

The implementation of operating and control system processes, and corresponding programming structures, suitable for use in implementing systems and processes according to the invention using the various architectures disclosed herein, including those shown in FIGS. 11A-11C, will not trouble those skilled in the relevant arts, once they have been made familiar with this disclosure.

Figure 12:
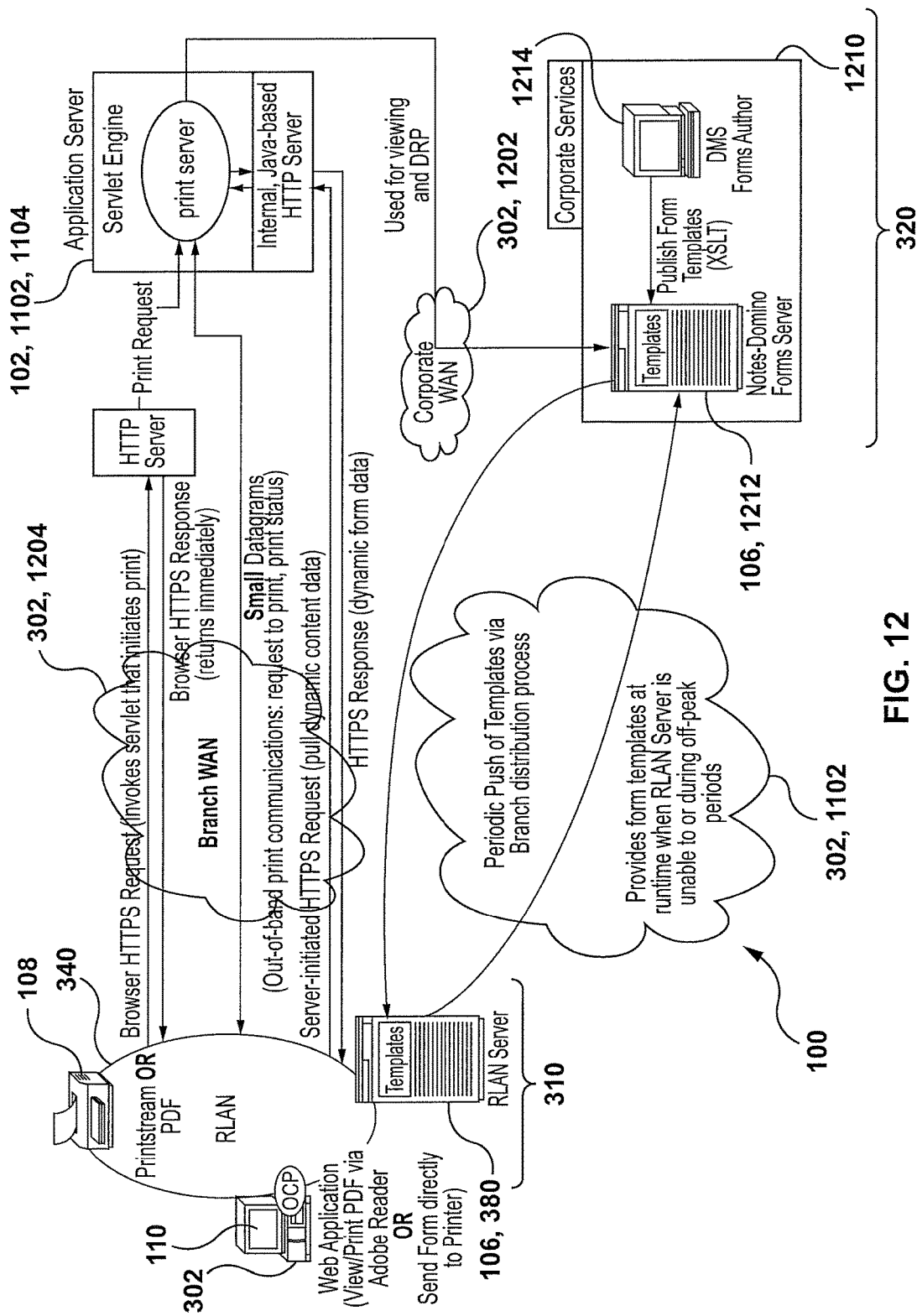

FIG. 12 provides a further example of a system architecture 100 suitable for use in implementing the invention. In the embodiment shown, client system 310 comprises one or more client workstations 302 with associated display(s) 110 and input device(s) 104, one or more printer(s) or other output device(s) 108, and local form data store(s) 106, 380, communicatively linked via RLAN 340. Client system 310 is further linked to server system 320 via corporate WAN(s) 302, 1202, and branch WAN 302, 1204. Server system 320 comprises a form data maintenance system 1210 comprising a form data store 106, 1212 adapted to serve as a back-up and/or authoritative version of form data used in compiling documents according to the invention, and a form data store server 1214 adapted for creation, maintenance, and other processing of form data stored therein. Thus for example output and/or application server 102 could be located together in a branch office of a business such as a bank, while creation, maintenance, etc., of form data can be controlled at a corporate office or other secure location.

The architecture shown in FIG. 12 is particularly useful for providing, among other benefits, safe and secure backups of form data stores 106 and reduced data transfer and processing requirements. By providing multiple instances of form data stores 106, such architectures provide, for example, significant benefits in the form of reduced signal traffic over communications networks, and reduction in other data processing. For example, in order to optimize efficiency in data flow via corporate WAN(s) 1202 and branch WAN(s) 1204, shared templates compilable using form data stored under the control of form data control system 1210 can be created and maintained using server 1214, and pushed at night or during other non-peak usage times to one or more branch form data stores 380 for rapid and efficient access during work periods. This can facilitate efficient maintenance and update of common form templates, as well as reduced demands on communications facilities such as network components.

Another advantageous feature offered by the use of multiple form data stores as shown for example in FIG. 12 is that a processor 102 accessing a local form data store 380 can, can be configured to, upon finding that a desired template or other desired form data is not present in the data store 380, or is out of date, access common or back-up data store 1212 to access a desired or more-current version.

In the embodiment shown in FIG. 12, communications between the various components of system 100 may be carried out using any desired or otherwise advantageous protocols, including hyper-text transfer protocol (HTTP), and compilation, output, and other processes can be implemented using Java, XML, and any other suitable programming systems.

Figure 13:
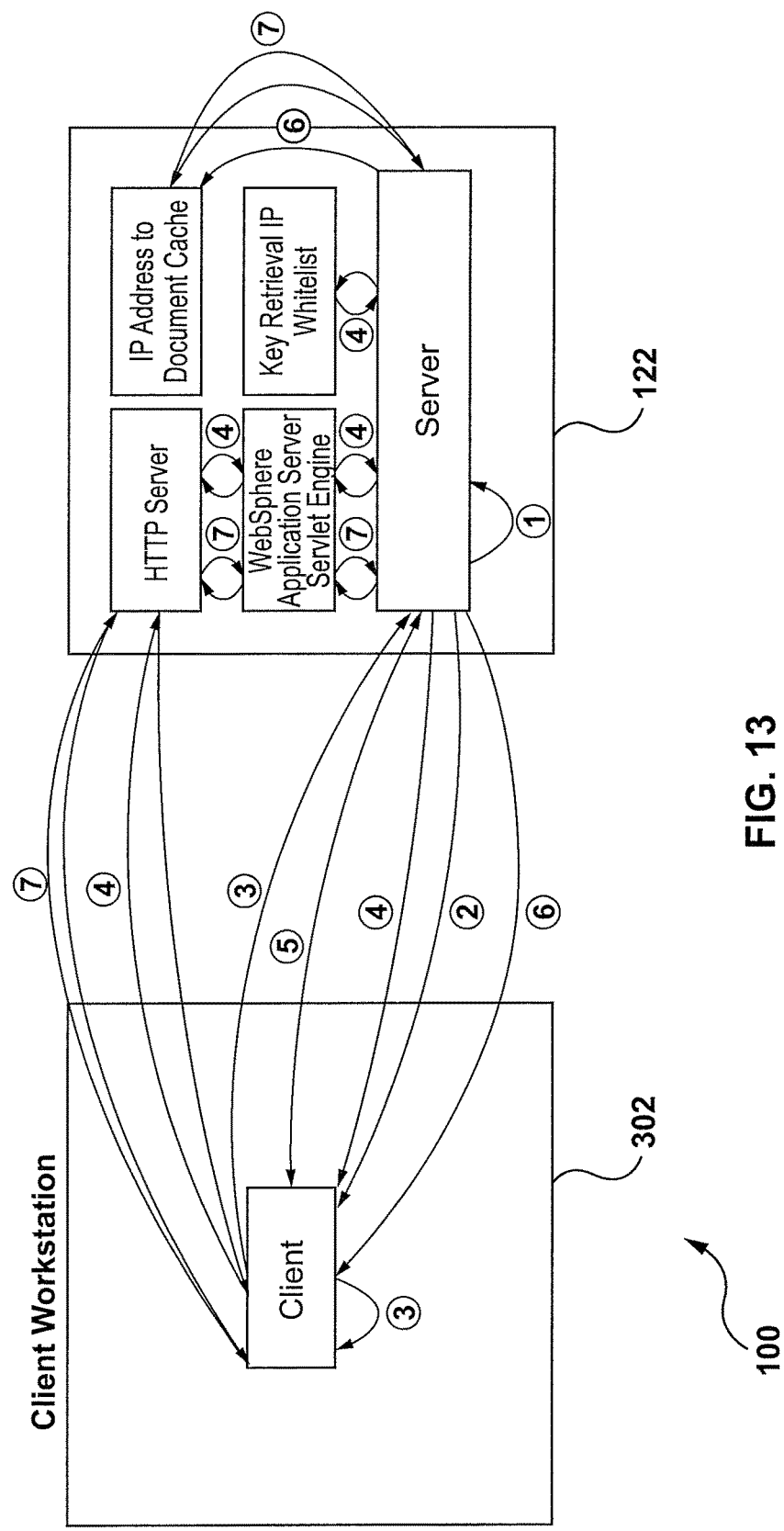
FIGS. 13 and 14 are schematic diagrams of process flows in accordance with the invention.

A schematic diagram of a process for controlling output of documents according to the invention is shown in FIG. 13. The process flow shown in FIG. 13 offers, among other advantages, inventive secure data communications built on existing communications protocols.

At 1 in FIG. 13 an application server 102 is initialized using secure techniques such as known unique user identification codes and passwords or dynamic secure keys (including for example RSA-type technology). The application server then executes an application adapted for gathering content data intended for output in documents prepared according to predetermined formats, using previously-defined form data, as described herein and as shown and explained in connection with, for example, FIG. 4.

At 2 the server 102, having collected desired content data and it being desired to print one or more documents using such data, as described for example in connection with processes 200 and 200' of FIGS. 2A and 2B, initiates a printing session with the client system 302. The server 102 sends to the client system 302 signals representing a request to verify a key useful in completing communications using an encryption scheme (for example, a symmetric encryption scheme), such as those currently known in the art. The verification can, for example, be in the form of a unique user identification, to be compared by the server 102 with a key maintained by the server 102 and identified by the server 102 with the corresponding client system 302. The request signal can also serve a "heartbeat" or other confirmatory signal confirming that the relevant client system 302 is communicatively operable.

At 3 the queried client system provides the requested key. Server 102 can determine whether the provided key corresponds to a corresponding key maintained by the server 102. If corresponding client-held and server-held keys are confirmed, appropriate acknowledgements may be made. If corresponding keys are not found, then, for example the server 102 can repeat the request, with appropriate warnings and notifications.

Where corresponding client- and server-keys are confirmed, at 4 the server 102 can update a list of authorized client systems (i.e., a "whitelist"), to ensure that only the successfully-queried client can retrieve the key in future. The server 102 can further provide the client system 302 with data such as a URL useable for retrieving content and/or form data. Having received such data, client system 302 can establish a secure HTTP or other suitable connection with the application server 102 using, for example, an appropriately-configured servlet, together with any other data useful or desired for verifying or establishing synchronized keys.

At 5, appropriately-keyed encrypted data signals can be exchanged by the server 102 and client system 302. A unique user identification corresponding to the client system 302 can be embedded within or otherwise associated with exchanged data records. Such data signals can represent, for example, requests for printer lists or lists of other suitable output devices 108 and status information relating to established output processes.

In cases such as those involving transfer of relatively large document output data sets, at 6 the server 102 can provide to the relevant client system 302 control signals indicating that the server will store the document output data set(s) in a memory 308 such as a cache controlled by the server 102, together with suitable address and other information useful in locating and retrieving the stored data set(s).

At 7 the authorized client system 302 can access the stored data set(s) and retrieve it for further output processing. At each retrieval step the authority of the client system 302 to access the data can be confirmed.

The invention further provides processes useful in developing templates comprising form data records, the templates suitable for use in compiling, in conjunction with appropriate content data, document output data sets in accordance with the invention. An example of such a process is shown in FIG. 14.

Figure 14:
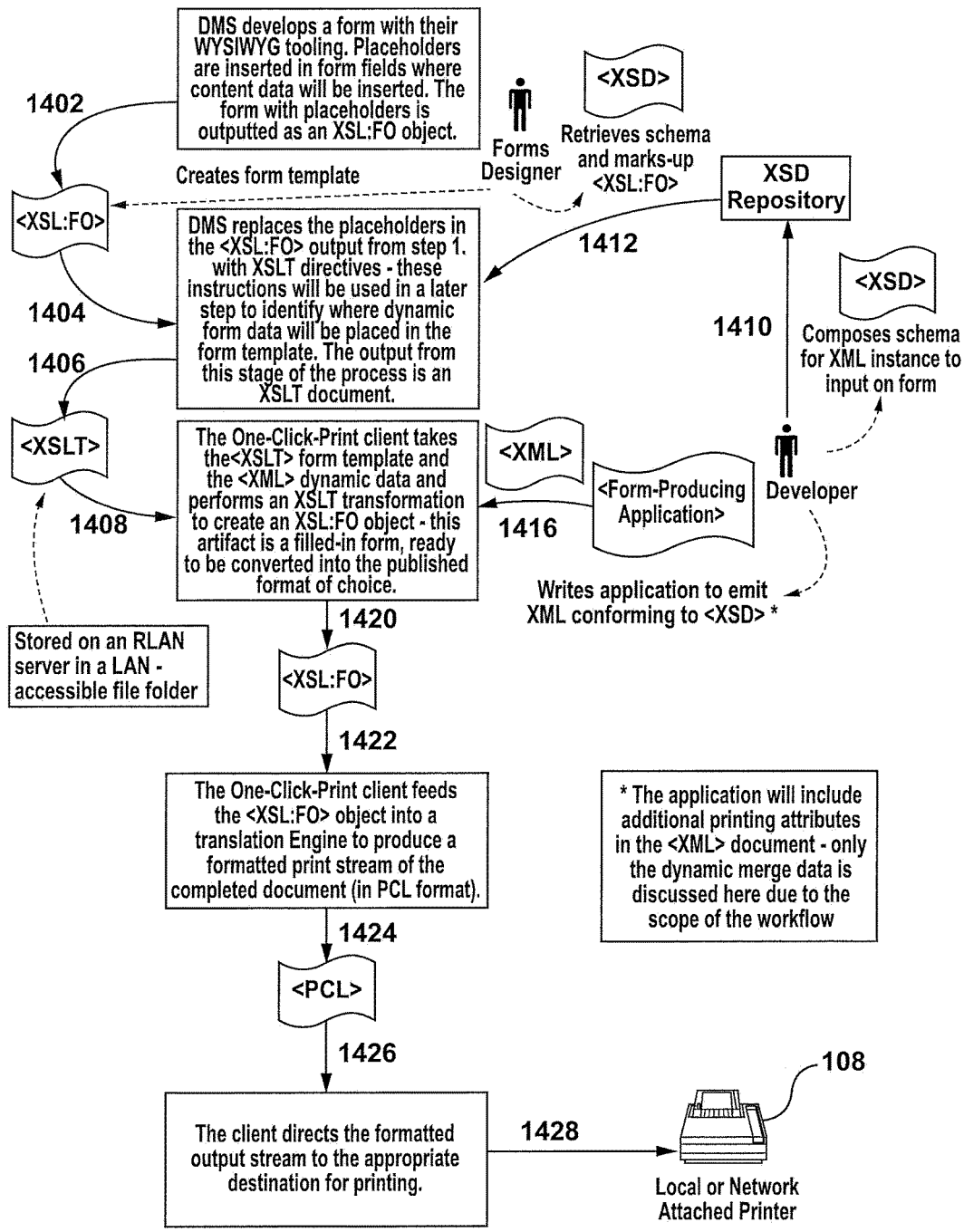

In the example shown in FIG. 14, templates are created and documents are processed using the XML protocol. At 1402 a document manager develops a form using, for example, programming tools compatible with relevant XML processes. Placeholders such as those shown at 614 in FIG. 6B2 are inserted into compilation instruction sets such as set 600 of FIG. 6, and the template, including placeholders, is outputted as a coded instruction set such as that shown in FIG. 6, which may for example be in the form of an XSL-FO object (i.e., an XML dialect for expressing document formatting.

In a parallel or separate process, at 1410 a developer composes a schema, or predetermined format, for a template to be used in outputting documents, the template comprising any desired form data records useful in causing a document outputted according to the invention to be printed in the desired predetermined format. Such templates may be constructed, for example, according to the XML protocol and stored as XML Schema Definition (XSD) records in one or more suitable form data store(s), or repository(ies), 106.

At 1406 the schema developed at 1410, 1412 and the schema developed at 1402 are merged. The placeholders provided at 1402 can be replaced with output from 1410, 1412. The result can be stored in one or more data stores 106 in the form of an XML Stylesheet Language Transformation (XSLT) document.

At 1416 a user of a processor 102 such as a client workstation 302 provides content data using, for example, and appropriately-configured application program such as that described in connection with FIG. 4. The processor 102 can execute a process such as that shown in FIG. 7 to compile a document output data set. The document output data set can be provided as for example an XSL:FO document.

At 1420 the document output data set compiled at 1416 can be stored in format-neutral form in one or more memory (ies) 308. If desired, a user can specify one or more desired output formats (e.g., PCL, .pdf, .doc, gif) and at 1424 the document output data set can be suitably translated by a translation engine into the desired format(s). At 1424 the translated document output data set can be provided to a desired output device and printed or otherwise output.

As will by understood by those skilled in the relevant arts, Printer Control Language (PCL) is an industry-standard page description language which describes actions and commands to be executed by a printer or other output device in order to output a document in a prescribed manner No additional software or hardware, other than the printer or other output device, is required to translate a PCL-compliant stream of data into the resultant print artifact.

Figure 15:
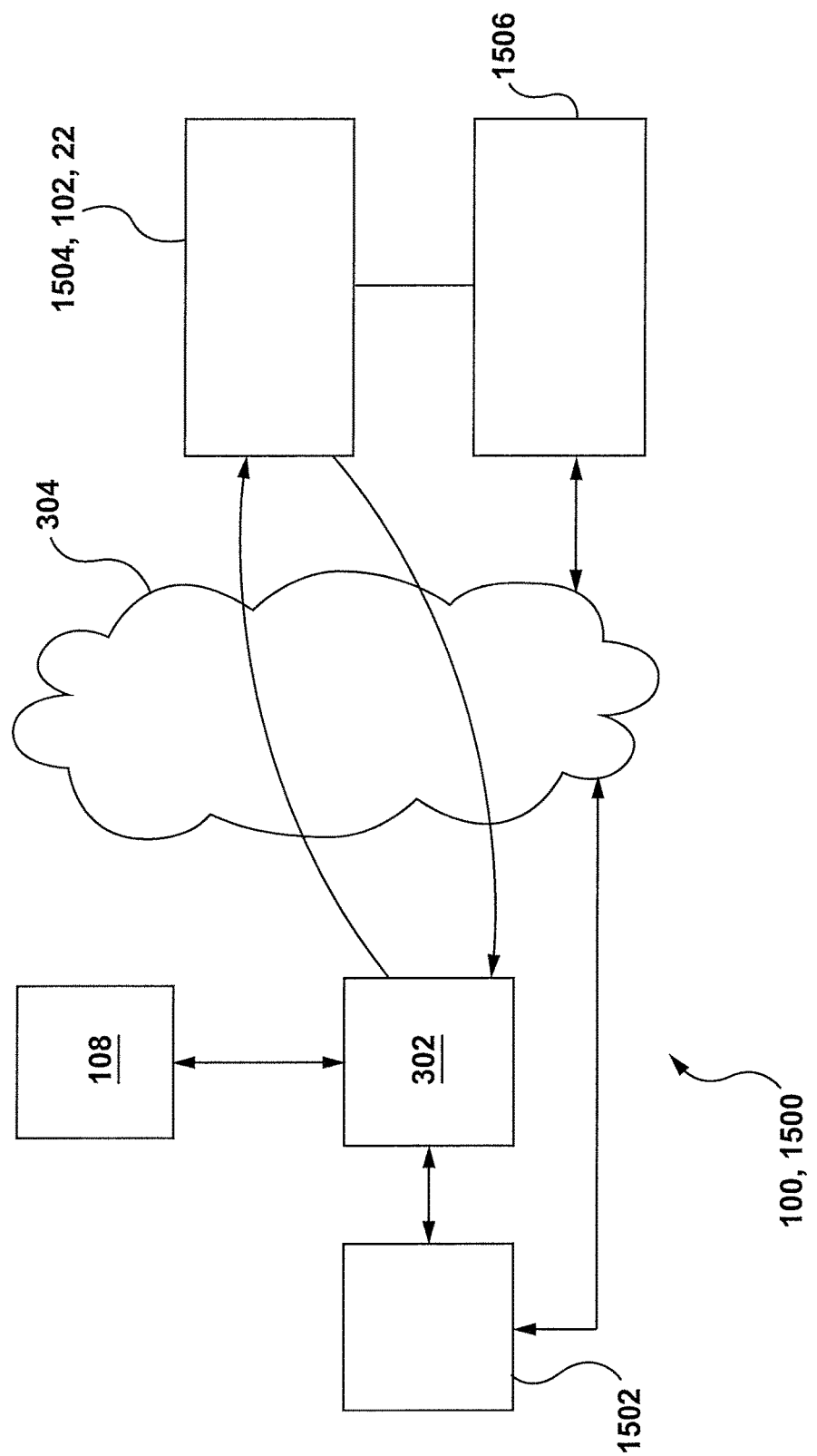
FIG. 15 is a schematic diagram of a system suitable for use in implementing the invention.

One advantageous aspect of the invention is its use in upgrading systems adapted for prior-art output control processes. An example of the applicability of the invention in upgrading one such so-called "legacy" system is shown in FIG. 15. In the embodiment shown, upgraded system 1500 comprises a client system 302, one or more printing device (s) 108, legacy print application 1502, and legacy output server 1506. Legacy print application and legacy output server 1506 are configured, for example, to print single documents using dedicated content data sets, without merging form and content data in accordance with the invention. However, by providing a suitably-adapted interface such as that shown in 5, system 1500 can present to a user of client system 302 an option for printing of pluralities of documents using merged content and form data, as described herein. For example, the client system 302 can be adapted to provide to a middleware application executed thereon, or, for example on application server 1504, 102, 122, data address information such as an Internet Protocol (IP) addresses to be used in conjunction with legacy output communications to control output processes.

Having received appropriately-identified address information, middleware server 1504 can wrap or otherwise associate the legacy-format output data into reformatted data comprising the provided addresses. Such wrapped or otherwise reformatted data can be returned to the client system 302 for use in further processing as described herein.

At the time of printing, the output server 102 can query the client system 302 to determine whether output control processes in accordance with the invention are to be used in conjunction with legacy applications. Upon receipt of data indicating a corresponding preference, the output server/middleware application 102, 1504 can perform appropriate reformatting and addressing.

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described.

The invention claimed is:

1. A system for compiling a plurality of types of documents associated with different events, wherein a different set of types of documents is associated with different events, comprising:
   an input device for:
      providing content data to an output server,
      providing a selection of selected document types to the output server, providing a command signal to the output server indicating that inputting of all content data has been completed, and saving a compiled document output data set and relaying the saved document output data set to a desired address, wherein at least a part of the provided content data is data obtained from a first set of document types associated with one or more previous events;

a form data store accessible by the output server and comprising form data usable by the output server for compiling, in combination with the provided content data, a plurality of selected documents according to at least one predetermined format;

a processor at the output server analyzing the provided content data and the form data store to, after receiving a command signal from the input device indicating that the inputting of all content data has been completed, but prior to receiving from the input device the selection of selected document types:

determine the plurality of types of documents that are compilable, determine a second set of document types that includes at least one document type that is different from any of the types of documents in the first set and which is associated with an event that is different from any of the one or more previous events, and identify for display the second set of types of documents that are compilable, the processor further, after receiving from the input device the selection of selected document types: generating a document set from the selection of selected document types using the provided content data, and compiling the plurality of documents identified in the generated document set by accessing the provided content data, accessing the form data from the form data store, and compiling the content data and form data into the compiled document output data set representative of a plurality of application-neutral formatted documents according to the document set;

a visual display in communication with the processor to display the second set of document types identified by the processor for selection to be provided from the input device; and an output device that is accessible to the output server and that has a memory that stores the document output data set.

2. The system of claim 1, wherein the output device relays the stored document output data set to an email address.

3. The system of claim 2, wherein the output device is an e-mail server.

4. The system of claim 3, wherein the processor further determines from the provided content data that additional content data associated with the content data is to be retrieved from a pre-existing content data store, the additional content data and content data store holding different information than the form data and the form data store, and the processor further identifying the plurality of types of documents to be compiled on the basis of the content data and the additional content data sufficiently meeting minimum content requirements, and the additional content data further being accessed to compile the plurality of documents identified in the generated document set.

5. The system of claim 4, wherein if the processor determines the provided content data and additional content data does not sufficiently meet the minimum content requirements for a document associated with the desired event, wherein the desired event is a different event from the one or more previous events, then the processor causing the input device to display a message that further content data needs to be provided.

6. The system of claim 5, wherein the message at the input device further identifies the document associated with the desired event that requires the further content data to be provided.

7. The system of claim 1, wherein the different events include loan or credit applications, issuance of securities, transfer of securities, opening savings or checking accounts, managing savings or checking accounts, purchasing or transferring shares in mutual funds or real property, purchasing or transferring personal property, and preparing, issuing and maintaining insurance policies.

8. A method of controlling a compiling of a plurality of types of documents associated with different events, wherein a different set of types of documents is associated with different events, the method performed by a computer and comprising:

receiving from an input device content data useful in preparing the plurality of types of documents, wherein at least a part of the received content data is data obtained from a first set of document types associated with one or more previous events;

receiving from a form data store form data usable for compiling, in combination with the provided content data, a plurality of selected documents according to at least one predetermined format;

receiving a command signal that the inputting of all content data has been completed;

determining the plurality of types of documents that may be compiled using the received content data and data from the form data store prior to an inputting of a document type selection or an event selection comprising determining a second set of document types that includes at least one document type that is different from any of the types of documents in the first set and which is associated with an event that is different from any of the one or more previous events, and identifying for display the second set of document types that are compilable;

displaying the second set of document types selected by the computer for selection;

generating a document set from the selected document types using the received content data, said generating the document set being without compiling any document in the document set for viewing on a display device;

accessing in a form data store form data useful for compiling, in combination with the received content data, a plurality of documents identified in the generated document set;

compiling the received content data and the form data into a document output data set representative of the compilable documents useful for outputting the plurality of documents in the compilable document set according to the at least one predetermined format;

storing the document output data set in the memory of an output device that is accessible to the output server; and saving the document output data set and relaying the saved document output data set to an address.

9. The method of claim 8, wherein the address is an e-mail address.

10. The method of claim 9, wherein the output device is an e-mail server.

11. The method of claim 10, wherein the different events include loan or credit applications, issuance of securities, transfer of securities, opening savings or checking accounts, managing savings or checking accounts, purchasing or transferring shares in mutual funds or real property, purchasing or transferring personal property, and preparing, issuing and maintaining insurance policies.

12. The method of claim 11, further comprising determining from the received content data that additional content data associated with the content data is to be retrieved from a pre-existing content data store, the additional content data and content data store holding different information than the form data and the form data store, identifying the plurality of types of documents to be compiled on the basis of the content data and the additional content data sufficiently meeting minimum content requirements, and accessing the content data store the additional content data to compile the plurality of documents in the document set.

13. The method of claim 12, further comprising, upon determining that the received content data and additional content data does not sufficiently meet the minimum content requirements for a document associated with the desired event, providing a message to be displayed at the input device that further content data needs to be provided, wherein the desired event is a different event from the one or more previous events.

14. The method of claim 13, wherein the message to be displayed at the input device further identifies the document associated with the desired event that requires the further content data to be provided.

15. A non-transitory computer usable media for storage of computer readable code embodied therein for causing a computer processor to generate a plurality of types of documents associated with different events, wherein a different set of types of documents is associated with different events by:
receiving from an input device content data useful in preparing a plurality of types of documents, wherein at least a part of the received content data is data obtained from a first set of document types associated with one or more previous events;
receiving from a form data store form data usable for compiling, in combination with the provided content data, a plurality of selected documents according to at least one predetermined format;
receiving a command signal that the inputting of all content data has been completed;
analyzing the received content data and form data to determine, after receiving the command signal but prior to a document type selection or an event selection, a plurality of types of documents that may be compiled, comprising determining a second set of document types that includes at least one document type that is different from any of the types of documents in the first set and which is associated with an event that is different from any of the one or more previous events, and identifying for display on a display device the second set of document types that are compilable;
displaying a list of the document types selected by the computer for selection;
generating a document set from the selected document types using the received content data, said generating of the document set occurring without compiling any document in the document set for viewing on the display device;
accessing in a form data store form data useful for compiling, in combination with the received content data, form data useful for outputting a plurality of documents in the document set according to a format;
compiling the received content data and the form data into the plurality of documents in the document set;
storing the document output data set in the memory of an output device that is accessible to the output server; and
saving the document output data set and relaying the saved document output data set to an address.

16. The media of claim 15, wherein the address is an e-mail address, and the output device is an e-mail server.

17. The media of claim 15, wherein the content and form data is compiled in an application-neutral format.

18. The media of claim 17, the computer readable code further causing a computer processor to determine from the received content data that additional content data associated with the content data is to be retrieved from a pre-existing content data store, the additional content data and content data store holding different information than the form data and the form data store, identify the plurality of types of documents to be compiled on the basis of the content data and the additional content data sufficiently meeting minimum content requirements, and access the content data store the additional content data to compile the plurality of documents in the document set.

19. The media of claim 18, the computer readable code further causing a computer processor to, upon determining that the received content data and additional content data does not sufficiently meet the minimum content requirements for a document associated with the desired event, provide a message to be displayed at the input device that further content data needs to be provided, wherein the desired event is a different event from the one or more previous events, wherein the message to be displayed at the input device further identifies the document associated with the desired event that requires the further content data to be provided, and wherein the volatile or persistent memory is at least one of incorporated into a printer, incorporated into a facsimile transmitter or used in connection with an electronic mail application.

20. The media of claim 15, wherein the different events include loan or credit applications, issuance of securities, transfer of securities, opening savings or checking accounts, managing savings or checking accounts, purchasing or transferring shares in mutual funds or real property, purchasing or transferring personal property, and preparing, issuing and maintaining insurance policies.

* * * * *

UNITED STATES PATENT AND TRADEMARK OFFICE
CERTIFICATE OF CORRECTION

| | | |
|---|---|---|
| PATENT NO. | : 9,612,786 B2 | Page 1 of 1 |
| APPLICATION NO. | : 15/217736 | |
| DATED | : April 4, 2017 | |
| INVENTOR(S) | : Thomas M. Kerigan et al. | |

It is certified that error appears in the above-identified patent and that said Letters Patent is hereby corrected as shown below:

On the Title Page

(72) Inventors should read:
Thomas M. Kerigan, Toronto, CANADA;
Robert Trojan, Toronto, CANADA;
Jeffrey A. Martin, Whitey, CANADA;
Christianne Moretti, Toronto, CANADA;
John Jong Suk Lee, Toronto, CANADA.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*